US006262161B1

(12) United States Patent
Betso et al.

(10) Patent No.: US 6,262,161 B1
(45) Date of Patent: *Jul. 17, 2001

(54) COMPOSITIONS HAVING IMPROVED IGNITION RESISTANCE

(75) Inventors: Stephen R. Betso, Leipzig (DE); Martin J. Guest, Lake Jackson; Richard M. Remenar, Pearland, both of TX (US); Jerker B. I. Kjellqvist, Wadenswil (CH); Yunwa W. Cheung, Lake Jackson, TX (US); David C. Kelley, Angleton, TX (US); William R. Van Volkenburgh, Lake Jackson, TX (US); Ronald Wevers, Langnau am Albis (CH); Fiona E. Keen, Chester (GB); Arnold W. Field, Wales (GB); Ian Reynolds, Cambridgeshire (GB)

(73) Assignee: The Dow Chemical Company, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/374,097

(22) Filed: Aug. 12, 1999

Related U.S. Application Data

(63) Continuation-in-part of application No. 08/882,819, filed on Jun. 26, 1997, now Pat. No. 5,973,049.

(51) Int. Cl.[7] .................................................. C08K 3/00
(52) U.S. Cl. .................... 524/425; 524/430; 524/431; 524/433; 524/436; 524/441; 524/442; 524/444; 524/445; 524/447; 524/449; 524/451
(58) Field of Search ...................... 524/425, 430, 524/431, 433, 436, 441, 442, 444, 445, 447, 449, 451

(56) References Cited

U.S. PATENT DOCUMENTS

| 3,645,992 | 2/1972 | Elston | 260/80.78 |
|---|---|---|---|
| 4,076,698 | 2/1978 | Anderson et al. | 526/348.6 |
| 4,434,258 | 2/1984 | Schumacher et al. | 524/13 |
| 5,017,637 | 5/1991 | Smith et al. | 524/354 |
| 5,026,798 | 6/1991 | Canich | 526/127 |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,096,867 | 3/1992 | Canich | 502/103 |
| 5,132,380 | 7/1992 | Stevens et al. | 526/126 |
| 5,189,192 | 2/1993 | LaPointe et al. | 556/11 |
| 5,244,996 | 9/1993 | Kawasaki et al. | 526/347 |
| 5,272,236 | 12/1993 | Lai et al. | 526/348.5 |
| 5,278,272 | 1/1994 | Lai et al. | 526/348.5 |
| 5,321,106 | 6/1994 | LaPointe | 526/126 |
| 5,347,024 | 9/1994 | Nickias et al. | 556/11 |
| 5,350,723 | 9/1994 | Neithamer et al. | 502/104 |
| 5,374,696 | 12/1994 | Rosen et al. | 526/126 |
| 5,380,810 | 1/1995 | Lai et al. | 526/352 |
| 5,399,635 | 3/1995 | Neithamer et al. | 526/126 |
| 5,470,993 | 11/1995 | Devorce et al. | 556/11 |
| 5,703,187 | 12/1997 | Timmers | 526/282 |
| 5,721,185 | 2/1998 | LaPointe et al. | 502/117 |
| 5,872,201 | 2/1999 | Cheung et al. | 526/282 |
| 5,883,213 | 3/1999 | Arai et al. | 26/347 |
| 6,103,803 | * 8/2000 | Cheung et al. | 524/425 |

FOREIGN PATENT DOCUMENTS

| 416815 | 3/1991 | (EP) | C08F/10/00 |
|---|---|---|---|
| 0 467 549 A2 | 1/1992 | (EP) | C09K/21/00 |
| 94/00500 | 1/1994 | (WO) | C08F/10/00 |
| 95/32095 | 11/1995 | (WO) | B32B/37/32 |
| 96/07681 | 3/1996 | (WO) | C08F/212/00 |
| 98/09999 A2 | 3/1998 | (WO) | C08F/210/02 |
| 98/09999 A3 | 3/1998 | (WO) | C08F/212/08 |
| 99/00449 | 1/1999 | (WO) | C08K/3/00 |

OTHER PUBLICATIONS

G. Witucki, "A Silane Primer: Chemistry and Applications of Alkoxy Silanes", *J. Coatings and Technology,* vol. 65, No. 822, p. 57, Jul. 1993.
James C. Randall, Polymer Sequence Determination Carbon–13 NMR Method, pp. 71–78, (1977).
K. Kircher, *Chemical Reactions in Polymer Processing,* pp. 62–63, Hanser Press, 1987.
International Search Report dated Sep. 22, 2000 issued by the EPO acting as the International Searching Authority in PCT/US00/15232.

* cited by examiner

Primary Examiner—Edward J. Cain

(57) ABSTRACT

The present invention relates to compositions having enhanced ignition resistance, comprising:

(A) from about 5 to about 90 percent by weight of at least one substantially random interpolymer;

(B) from about 10 to about 94.9 percent by weight of at least one filler selected from ammonium polyphosphate, magnesium hydroxide, calcium hydroxide, and aluminum trihydrate; and (C) at least one component selected from;
  (1) about 5 to about 50 percent by weight of at least one filler; or
  (2) about 0.5 to about 20 percent by weight of at least one metal borate, and, optionally, about 0.5 to about 10 percent by weight of at least one processing aid; or
  (3) about 0.1 to about 15 percent by weight of at least one initiator or at least one coupling agent; or
  (4) about 0.1 to about 20 percent by weight of at least one hindered amine stabilizer.

22 Claims, No Drawings

COMPOSITIONS HAVING IMPROVED IGNITION RESISTANCE

CROSS-REFERENCE TO RELATED APPLICATIONS

This application is a continuation-in-part of U.S. application Ser. No. 08/882,819, filed Jun. 26, 1997 now U.S. Pat. No. 5,973,049, which is incorporated herein by reference.

STATEMENT REGARDING FEDERALLY SPONSORED RESEARCH OR DEVELOPMENT

Not Applicable

FIELD OF THE INVENTION

This invention relates to filled interpolymer compositions of ethylene and/or α-olefin/vinyl or vinylidene monomers, showing improved performance under exposure to flame or ignition sources, and fabricated articles thereof. Said articles are often in the form of a film, sheet, a multilayered structure, a floor, wall, or ceiling covering, foams, fibers, electrical devices, or wire and cable assemblies.

BACKGROUND AND SUMMARY OF THE INVENTION

The generic class of materials described as substantially random interpolymers, and including materials such as ethylene and/or α-olefin/vinyl aromatic monomer interpolymers, are known in the art and offer a range of material structures and properties which makes them useful for varied applications.

Although of utility in their own right, industry is constantly seeking to improve the applicability of these interpolymers, for example to extend the temperature range of application. It is also desirable to develop technologies to provide improvements in processability or performance.

Fillers are frequently used to improve the stiffness of polymer compositions, or to decrease the coefficient of linear thermal expansion, or to decrease the overall cost of the polymer composition, or to impart additional performance characteristics to the materials such as ignition resistance. Filled ethylene/vinyl monomer interpolymer compositions have been disclosed in WO 99/00449, the entire contents of which are herein incorporated by reference. Typically, the filler is incorporated at levels ranging from 5 to 90 weight percent of the formulation, depending upon the filler density. In view of the wide ranges of desirable properties and uses for materials based on ethylene and or α-olefin/vinyl or vinylidene monomer interpolymers, it is desirable to provide new compositions showing enhanced ignition resistance.

We have now found that filled compositions comprising thermoplastic substantially random interpolymers which have been prepared by polymerizing ethylene and/or one or more α-olefin monomers with one or more vinyl or vinylidene aromatic monomers and/or one or more hindered aliphatic or cycloaliphatic vinyl or vinylidene monomers, and optionally with other polymerizable ethylenically unsaturated monomer(s) can be blended with a further component to impart surprisingly enhanced ignition resistance, as compared to corresponding thermoplastic interpolymer compositions without this component. The articles made from the compositions of the present invention have a substantially enhanced ignition resistance while generally maintaining good elongation properties, such as strain at break, stress at break and energy at break.

Although styrene-containing polymers such as polystyrene are prone to ignition and smoke generation, we have surprisingly found that the compositions of the present invention comprising substantially random interpolymers (even including those with high styrene contents), are able to achieve smoke densities below that of poly (vinyl chloride) (PVC)-based materials, and equivalent to those of non-styrene containing polymers such as ethylene/vinyl acetate (EVA) and ethylene/octene copolymers. We have also surprisingly found that, unlike EVA compositions, when the compositions of the present invention are used in combination with a coupling agent, there is no big drop in tear strength at increased temperature. In addition, the coupled compositions of the present invention show a large reduction in Flexural Modulus resulting in improved flexibility, while maintaining a smooth surface on extrusion. This combination of ignition resistance and low smoke generation, high tear strength, good flexibility and smooth surface renders the materials excellent PVC replacements.

We have also surprisingly found that the compositions of the present invention comprising a substantially random interpolymer are able to maintain values of Shore D hardness and Limiting Oxygen Index (LOI), only achievable in an EVA-based formulation by adding a mixture of ethylene/propylene (EP) rubber and polypropylene.

We have also surprisingly found that with the compositions of the present invention, it is possible to replace some of an ignition resistant additive, such as alumina trihydrate (ATH) or magnesium hydroxide, with an inert filler, for example $CaCO_3$ and still maintain the ignition resistance of the materials.

The compositions of the present invention can be used as blends with ignition resistant polystyrene and surprisingly, the incorporation of processing aids based on oxidized polyethylene still results in a viscosity drop.

Using the compositions of the present invention, it is also possible to vary the penetration properties of the fabricated articles made from the resulting blend by varying the levels of silane and peroxide in the composition.

Finally, we have found a surprising synergistic interaction of hindered amine stabilizers such as CGL 116 with ignition resistant additives such as ATH results in a lower LOI reading and improved UL-94 rating.

The compositions having enhanced ignition resistance comprise:

(A) from about 5 to about 90 weight percent by weight of at least one substantially random interpolymer prepared by polymerizing ethylene and /or one or more α-olefin monomers with one or more vinyl or vinylidene aromatic monomers, and optionally with other polymerizable ethylenically unsaturated monomer(s);

(B) from about 10 to about 94.9 percent by weight of at least one filler selected from ammonium polyphosphate, magnesium hydroxide, calcium hydroxide, and aluminum trihydrate; and (C) at least one component selected from;
  (1) about 5 to about 50 weight percent by weight of at least one filler selected from talc, calcium carbonate, glass fibers, marble dust, cement dust, clay, feldspar, silica or glass, fumed silica, silicates, alumina, magnesium oxide, antimony oxide, zinc oxide, barium sulfate, aluminum silicate, calcium silicate, titanium oxides, glass microspheres, mica, clays, wollastonite, and chalk; or
  (2) about 0.5 to about 20 percent by weight of at least one metal borate selected from the metal borates of Group IIA, and, optionally, about 0.5 to about 10 percent by weight of at least one processing aid selected from the group consisting of polydimethyl siloxane, organopolysiloxanes, tartaric acid, stearic acid, zinc stearic, waxes, and high melt flow polyolefins; or (3) about 0.1 to about 15 percent by weight of at least one initiator or at least one coupling agent selected from the group consisting of organic peroxides, silanes, titanates, zirconates, multifunctional vinyl compounds and organic azides; or (4) about 0.1 to about 20 percent by weight of at least one hindered amine stabilizer;

wherein the amounts of (A), (B) and (C) are based on the total weight of (A), (B) and (C). If a coupling agent of (C)(3) is present then the coupling agent may couple at least a portion of at least one filler to at least a portion of at least one interpolymer.

In a further aspect, the present invention relates to fabricated articles made from such a composition, including those made by injection molding, compression molding, extrusion, or blow molding. Said articles are often in the form a film, sheet, a multilayered structure, a floor, wall, or ceiling covering, foams, fibers, electrical devices, or wire and cable assemblies.

DETAILED DESCRIPTION OF THE INVENTION

Any numerical values recited herein include all values from the lower value to the upper value in increments of one unit, provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 and the like, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "composition" as used herein includes a mixture of the materials which comprise the composition, as well as, products formed by the reaction or the decomposition of the materials which comprise the composition. Specifically included within the compositions of the present invention are grafted or coupled compositions wherein component (C)(3) is present and reacts with at least a portion of the one or more interpolymers and/or at least a portion of the one or more fillers.

The term "interpolymer" is used herein to indicate a polymer wherein at least two different monomers are polymerized to make the interpolymer.

The term "derived from" means made or mixed from the specified materials, but not necessarily composed of a simple mixture of those materials. Compositions "derived from" specified materials may be simple mixtures of the original materials, and may also include the reaction products of those materials, or may even be wholly composed of reaction or decomposition products of the original materials.

The term "substantially random" in the substantially random interpolymers resulting from polymerizing ethylene and or one or more α-olefin monomers and one or more vinyl or vinylidene aromatic monomers and optionally with other polymerizable ethylenically unsaturated monomer(s) as used herein, preferably means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Preferably, the substantially random interpolymer resulting from polymerizing one or more α-olefin monomers and one or more vinyl or vinylidene aromatic monomer, and optionally, with other polymerizable ethylenically unsaturated monomer(s) does not contain more than 15 percent of the total amount of vinyl or vinylidene aromatic monomer in blocks of vinyl or vinylidene aromatic monomer of more than 3 units. More preferably, the interpolymer was not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Interpolymer of Component (A).

Component (A) of the present invention comprises one or more substantially random interpolymers of ethylene and /or one or more α-olefins with one or more vinyl or vinylidene aromatic monomers. The amount of substantially random interpolymer of Component (A) of the composition may vary according to the end-use application in which the composition is to be employed. Typically, the interpolymer comprises at least about 5, preferably at least about 20 weight percent of the composition and less than about 90, preferably less than about 70 weight percent of the composition.

Suitable α-olefin monomers include, for example, α-olefin monomers containing from 3 to 20, preferably from 3 to 12, more preferably from 3 to 8 carbon atoms. Preferred such monomers include propylene, butene-1, pentene-1, 4-methyl-1-pentene, hexene-1 and octene-1. Most preferred are ethylene or a combination of ethylene with $C_{3-8}$-α-olefins. These α-olefins do not contain an aromatic moiety.

Suitable vinyl or vinylidene aromatic monomers which can be employed to prepare the substantially random interpolymers employed in the compositions of the present invention include, for example, those represented by the following formula;

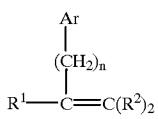

wherein $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to 4, preferably from zero to 2, most preferably zero. Particularly suitable such monomers include styrene and lower alkyl- or halogen-substituted derivatives thereof. Exemplary vinyl or vinylidene aromatic monomers include styrene, vinyl toluene, α-methylstyrene, t-butyl styrene or chlorostyrene, including all isomers of these compounds. Preferred monomers include styrene, α-methyl styrene, the lower alkyl- ($C_1$–$C_4$) or phenyl-ring substituted derivatives of styrene, such as for example, ortho-, meta-, and para-methylstyrene, the ring halogenated styrenes, para-vinyl toluene or mixtures thereof. A more preferred aromatic vinyl or vinylidene monomer is styrene.

Other suitable vinyl or vinylidene monomers which can be employed to prepare the substantially random interpolymers are the hindered aliphatic or cycloaliphatic vinyl or vinylidene compounds, by which is meant addition polymerizable vinyl or vinylidene monomers corresponding to the formula:

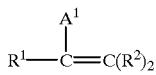

wherein $A^1$ is a hindered aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and A together form a ring system and in which one of the carbon atoms bearing ethylenic unsaturation is tertiary or quaternary substituted. The term "hindered" means that the monomer bearing this substituent is normally incapable of addition polymerization by standard Ziegler-Natta polymerization catalysts at a rate comparable with ethylene polymerizations. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene. Simple linear non-branched α-olefins including for example, α-olefins containing from 3 to about 20 carbon atoms such as propylene, butene-1, 4-methyl-1-pentene, hexene-1 or octene-1 are not examples of sterically hindered aliphatic or cycloaliphatic vinyl or vinylidene compounds.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

The interpolymers of ethylene and/or one or more α-olefins and one or more vinyl or vinylidene aromatic monomers employed in the present invention are substantially random polymers. These interpolymers usually contain from 0.5 to 65, preferably from about 3 to 55, more preferably from 5 to 40, most preferably from 6 to 15 mole percent of at least one vinyl or vinylidene aromatic monomer and from 35 to 99.5, preferably from 45 to 97, more preferably from 60 to 95, most preferably from 85 to 94 mole percent of ethylene and/or at least one aliphatic α-olefin having from 3 to 20 carbon atoms.

The melt index according to ASTM D-1238, Condition 190° C./2.16 kg (also known as $I_2$), generally is from 0.01 to 50, preferably from 0.01 to 20, more preferably from 0.1 to 10, and most preferably from 0.5 to 5 g/10 min.

Polymerizations and unreacted monomer removal at temperatures above the autopolymerization temperature of the respective monomers may result in formation of some amounts of homopolymer polymerization products resulting from free radical polymerization. For example, while preparing the substantially random interpolymer, an amount of atactic vinyl or vinylidene aromatic homopolymer may be formed due to homopolymerization of the vinyl or vinylidene aromatic monomer at elevated temperatures. The presence of vinyl or vinylidene aromatic homopolymer is in general not detrimental for the purposes of the present invention and can be tolerated. The vinyl or vinylidene aromatic homopolymer may be separated from the interpolymer, if desired, by extraction techniques such as selective precipitation from solution with a non-solvent for either the interpolymer or the vinyl or vinylidene aromatic homopolymer. For the purpose of the present invention it is preferred that no more than 20 weight percent, preferably less than 15 weight percent based on the total weight of the interpolymers of vinyl or vinylidene aromatic homopolymer is present.

The substantially random interpolymers may be modified by typical grafting, hydrogenation, functionalizing, or other reactions well known to those skilled in the art. For example, the polymers may be readily sulfonated or chlorinated to provide flnctionalized derivatives according to established techniques.

The substantially random interpolymers can be prepared as described in U.S. application Ser. No. 07/545,403 filed Jul. 3, 1990 (corresponding to EP-A-0,416,815) by James C. Stevens et al. and in U.S. Pat. Nos. 5,703,187 and 5,872,201, the entire contents of all of which are herein incorporated by reference. Preferred operating conditions for such polymerization reactions are pressures from atmospheric up to 3,000 atmospheres and temperatures from −30° C. to 200° C.

Examples of suitable metallocene catalysts and methods for preparing the substantially random interpolymers are disclosed in U.S. application Ser. No. 702,475, filed May 20, 1991 (EP-A-514,828); as well as U.S. Pat. Nos.: 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of which patents and applications are incorporated herein by reference.

The substantially random α-olefin/vinyl aromatic interpolymers can also be prepared by the methods described in JP 07/278230 employing compounds shown by the general formula

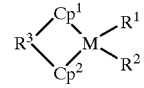

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf; most preferably Zr; and $R^3$ is an alkylene group or silanediyl group used to cross-link $Cp^1$ and $Cp^2$).

The substantially random α-olefin/vinyl aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in Plastics Technology, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,869 filed Sep. 4, 1996 and WO 98/09999 both by Francis J. Timmers et al. These interpolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/ vinyl aromatic monomer/ethylene tetrad will give rise to similar carbon-13 NMR peaks but with slightly different chemical shifts.

These interpolymers can be prepared by conducting the polymerization at temperatures of from about −30° C. to about 250° C. in the presence of such catalysts as those represented by the formula

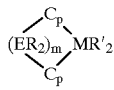

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hyrocarbyloxy, silahydrocarbyl, hydrocarbylsilyl containing up to about 30 preferably from 1 to about 20 more preferably from 1 to about 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

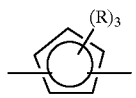

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl) zirconium dichloride, racemic-(dimethylsilanediyl)-bis-(2-methyl-4-phenylindenyl) zirconium 1,4-diphenyl-1,3-butadiene, racemic-(dimethylsilanediyl)-bis-(2-methyl-4-phenylindenyl) zirconium di-C1–4 alkyl, racemic-(dimethylsilanediyl)-bis-(2-methyl-4-phenylindenyl) zirconium di-C1–4 alkoxide, or any combination thereof and the like.

It is also possible to use the following titanium-based constrained geometry catalysts, [N-(1,1-dimethylethyl)-1,1-dimethyl-1-[(1,2,3,4,5-η)-1,5,6,7-tetrahydro-s-indacen-1-yl]silanaminato(2-)-N]titanium dimethyl; (1-indenyl)(tert-butylamido)dimethyl-silane titanium dimethyl; ((3-tert-butyl)(1,2,3,4,5-η)-1-indenyl)(tert-butylamido) dimethylsilane titanium dimethyl; and ((3-iso-propyl)(1,2,3, 4,5-η)-1-indenyl)(tert-butyl amido)dimethylsilane titanium dimethyl, or any combination thereof and the like.

Further preparative methods for the interpolymer component (A) of the present invention have been described in the literature. Longo and Grassi (Makromol. Chem., Volume 191, pages 2387 to 2396 [1990]) and D'Anniello et al. (Journal of Applied Polymer Science, Volume 58, pages 1701 to 1706 [1995]) reported the use of a catalytic system based on methylalumoxane (MAO) and cyclopentadienylti-tanium trichloride ($CpTiCl_3$) to prepare an ethylene-styrene copolymer. Xu and Lin (Polymer Preprints, Am. Chem. Soc., Div. Polym. Chem., volume 35, pages 686, 687 [1994]) have reported copolymerization using a $MgCl_2$/ $TiCl_4$/$NdCl_3$/Al(iBu)$_3$ catalyst to give random copolymers of styrene and propylene. Lu et al. (Journal of Applied Polymer Science, volume 53, pages 1453 to 1460 [1994]) have described the copolymerization of ethylene and styrene using a $TiCl_4$/$NdCl_3$/$MgCl_2$/Al(Et)$_3$ catalyst. Sernetz and Mulhaupt, (Macromol. Chem. Phys., volume 197, pages 1071 to 1083 [1997]) have described the influence of polymerization conditions on the copolymerization of styrene with ethylene using $Me_2Si(Me_4Cp)(N-tert-butyl)TiCl_2$/ methylaluminoxane Ziegler-Natta catalysts. The manufacture of α-olefin/vinyl aromatic monomer interpolymers such as ethylene/sytrene, propylene/styrene and butene/styrene are described in U.S. Pat. No. 5,244,996, issued to Mitsui Petrochemical Industries Ltd, or as disclosed in DE 197 11 339 A1 and U.S. Pat. No. 5,883,213 both to Denki Kagaku Kogyo KK. All the above methods disclosed for preparing the interpolymer component are incorporated herein by reference. Also the random copolymers of ethylene and styrene as disclosed in Polymer Preprints Vol. 39, No. 1, March 1998 by Toru Aria et al. can also be employed as blend components for the present invention.

Filler of Component (B).

The amount of filler of component (B) of the present invention may vary according to the end-use application in which the composition is to be employed. Typically, the amount of component (B) comprises from at least about 10, preferably at least about 20 weight percent of the composition and less than about 94, preferably less than about 80 weight percent of the composition.

The type of filler of component (B) also may vary according to the end-use application in which the composition is to be employed. Generally, it is desired that component (B) is a filler which offers surprising and unexpected ignition resistance properties to the composition. Fillers which have been discovered to offer such surprising and unexpected ignition resistance include ammonium polyphosphate, magnesium hydroxide, calcium hydroxide, aluminum trihydrate (also referred to as aluminum trihydroxide) and mixtures thereof.

Component (C).

The compositions of the present invention comprise one or more components selected from the group consisting of:

(1) at least one filler selected from talc, calcium carbonate, glass fibers, marble dust, cement dust, clay, feldspar, silica or glass, fumed silica, silicates, alumina, magnesium oxide, antimony oxide, zinc oxide, barium sulfate, aluminum silicate, calcium silicate, titanium oxides, glass microspheres, mica, clays, wollastonite, and chalk;

(2) at least one metal borate selected from the metal borates of Group IIA, and, optionally, at least one processing aid selected from the group consisting of polydimethyl siloxane, organopolysiloxanes, tartaric acid, stearic acid, zinc stearic, waxes, and high melt flow polyolefins;

(3) at least one initiator or at least one coupling agent selected from the group consisting of organic peroxides, silanes, titanates, zirconates, multifunctional vinyl compounds and organic azides; and (4) at least one hindered amine stabilizer.

As discussed below in regard to the coupling agent, (C)(3), when a coupling agent is present, at least a portion of at least one filler, i.e., component (B) and component (C)(1) if present, may be coupled to at least a portion of at least one interpolymer.

Filler of Component (C)(1).

The presence and amount of filler of component (C)(1) of the present invention may vary according to the end-use application in which the composition is to be employed. If present, the amount of component (C)(1) generally comprises from about 5 to about 90 weight percent of the composition.

The type of filler of component (C)(1) also may vary according to the end-use application in which the composition is to be employed. Typical fillers include those other than component (B) such as talc, calcium carbonate, glass fibers, marble dust, cement dust, clay, feldspar, silica or glass, fumed silica, silicates, alumina, magnesium oxide, antimony oxide, zinc oxide, barium sulfate, aluminum silicate, calcium silicate, titanium oxides, glass microspheres, chalk, mica, clays, wollastonite, and mixtures thereof.

Talc, calcium carbonate, barium sulfate, glass fibers, and mixtures thereof are preferable fillers for component (C)(1). It is preferable to use such preferable fillers in an amount of from about 20 to about 70 weight percent.

A particularly preferable filler for component (C)(1) is calcium carbonate. In some instances, if calcium carbonate is employed in a weight ratio of calcium carbonate to component (B), e.g., ATH, of about 0.8 to about 1.2, then comparable ignition resistance may be exhibited to the analogous composition containing the same total weight but of ATH only. This is surprising and unexpected in that the amount of the thermally sensitive ignition resistant component (B) may be reduced, with concurrent improvements in processability and cost savings (given the relative costs of the two fillers).

Component (C)(2).

The amount of component (C)(2) of the present invention may vary according to the end-use application in which the composition is to be employed. Component (C)(2) is not required to be present in the compositions of the present invention. However, if present, the amount of component (C)(2) generally comprises from about 0.5 to about 20, preferably from about 1 to about 15, more preferably from about 2 to about 10 weight percent of the composition.

Component (C)(2) also may vary according to the end-use application in which the composition is to be employed. Typically, component (C)(2) is selected from a metal borate of Group IIA. A particularly preferred component for (C)(2) is zinc borate.

Often, to improve the efficacy of component (C)(2), a multifunctional processing aid is added. The amount of the processing aid is from about 0.5 to about 10 weight percent of the composition. The processing aid is selected from the group consisting of polydimethylsiloxane, other organopolysiloxanes, tartaric acid, stearic acid, zinc stearic, high melt flow polyolefins, low molecular weight waxes, or mixtures thereof. Preferred processing aids are polydimethylsiloxane, tartaric acid, and high melt flow polyetheylenes. One skilled in the art would recognize and choose the appropriate processing aid or combination suitable for the desired application.

U.S. Pat. No. 5,017,637, incorporated by reference, describes the use of components such as zinc borate in conjunction with polymers such as ethylene-vinyl acetate (EVA), ethylene-acrylic acid (EAA), and EPDM. Advantageously, surprising and unexpected results in regard to ignition resistance can be obtained when the interpolymers of component (A) are substituted for at least 50, preferably at least 75, more preferably at least 90 percent of the polymers in the compositions disclosed in U.S. Pat. No. 5,017,637. The surprising and unexpected results are often indicated by improvements in Shore D and the Limiting Oxygen Index (LOI).

Component (C)(3).

The amount of component (C)(3) of the present invention may vary according to the end-use application in which the composition is to be employed. Component (C)(3) is not required to be present in the compositions of the present invention. However, if present, the amount of component (C)(3) generally comprises from about 0.1 to about 15 weight percent of the composition.

Component (C)(3) also may vary according to the end-use application in which the composition is to be employed. Typically, component (C)(3) is a coupling agent and/or initiator selected from organic peroxides, silanes, titanates, zirconates, multi-functional vinyl compounds, organic azides, and mixtures thereof. While not wishing to be bound to any theory, it is believed that under some conditions component (C)(3) may become coupled, i.e., grafted, to the interpolymer or another polymer of the composition capable of such grafting. Similarly, component (C)(3) may become coupled, i.e., bound to at least one filler. Thus, component (C)(3) often serves as a coupling agent which may couple the following components:

(a) interpolymers or polymers to other interpolymers or polymers;

(b) fillers to other fillers;

(c) fillers to interpolymer or polymers; or (d) combinations thereof. It is believed that the interpolymer is typically grafted onto the coupling agent via a vinyl group while an active polar group on the coupling agent usually binds the coupling agent to the filler.

The extent of coupling, if any, varies depending on the amount and types of ingredients and the conditions to which the ingredients are subjected. Preferably, the amount, types of ingredients and conditions are such that at least a portion of at least one filler, e.g. component (B) and, if present, component (C)(1), is coupled to at least a portion of at least one interpolymer of component (A) or any other polymer component which may be present in the composition. It is particularly preferred to employ from about 20 to about 70 weight percent component (B) and talc, calcium carbonate, barium sulfate, or glass fibers as component (C)(1) in a manner such that at least a portion of Components (B) and (C)(1) are coupled to at least a portion of the interpolymer of component (A).

The above-mentioned interpolymers suitable in the composition of the present invention are usually thermoplastic, that is, the interpolymer may be molded or otherwise shaped and reprocessed at temperatures above their melting or softening point. However, when a coupling agent is present in the composition, the interpolymer may undergo some crosslinking. Thus, if a thermoplastic composition is desired, the amount of coupling agent should be at least the amount necessary to generate the desired amount of coupling or grafting but not so much that the thermoplastic nature of the composition is jeopardized.

If a non-thermoplastic composition is desired, a crosslinking process can be carried out by standard practices (which include standard chemical, photo-induced, or radiation-induced processes) or by the addition of an amount of component (C)(3), such that the composition, when cured, is not thermoplastic. This process can be applied to the whole composition or selectively to the surface or other sections of the composition.

The coupling agent may be grafted to the interpolymer by any conventional method. Such methods and agents are described in, for example, K. Kircher, "Chemical Reactions in Polymer Processing", pp. 62–63, Hanser Press, 1987, and G. Witucki, "A Silane Primer: Chemistry and Applications of Alkoxy Silanes", *J. Coatings and Technology*, Vol. 65, No. 822, p. 57, July 1993, incorporated by reference herein.

Such methods typically include the presence of a free radical initiator such as a peroxide or an azo compound or ionizing radiation. Organic initiators, especially peroxide initiators, are preferred. Examples of peroxide initiators include, but are not limited to, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy) hexane, lauryl peroxide, di(t-butyl peroxy) 3,3,5-trimethylcyclohexane, and t-butyl peracetate. Suitable azo compounds include those such as azo-bis-isobutyl nitrite. Alternatively, the coupling agent may be coated on one or more of the fillers and the vinyl groups replaced with a group, which is compatible with the interpolymer.

Suitable coupling agents include any agent, which can be grafted to the interpolymer. Such coupling agents include, but are not limited to, for example, silanes, titanates, zirconates, multifunctional vinyl compounds, and mixtures thereof. Typical titanates and zirconates are described in, for example, Ken-React Reference Manual, Kenrich Petrochemical Inc. 1985, incorporated herein by reference. Preferable coupling agents include silanes, vinyl alkoxy titanates, zirconates, or vinyl substituted alkoxy or arlyoxy titanates or zirconates. Particularly preferable coupling agents include those described below.

Any silane, or a mixture of such silanes, that will effectively graft to the interpolymer of the present invention, can be used as the silane moiety in the present invention. Suitable silanes include those of the general formula;

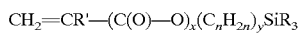

in which R' is a hydrogen atom or methyl group; x and y are 0, 1, 2 or 3, n is an integer from 1 to 12 inclusive, preferably 1 to 4, and each R independently is a hydrolyzable organic group such as substituted or unsubstituted C1–12 alkoxy groups (e.g., methoxy, ethoxy, butoxy, etc.), substituted or unsubstituted aryloxy groups (e.g., phenoxy, etc.), substituted or unsubstituted aralkoxy groups (e.g., benzyloxy, etc.), substituted or unsubstituted C1–12 aliphatic acyloxy groups (e.g., formyloxy, acetyloxy, propanoyloxy, etc.), amino or amino groups substituted with a suitable substituent such as alkyl or aryl, or a substituted or unsubstituted lower alkyl (C1–6) group, with the proviso that not more than two of the three R groups is an alkyl (e.g., vinyl dimethyl methoxy silane). The use of "C" with a subscript range denotes the number of carbon atoms in, for example, a lower alkyl group.

Silanes are also useful which have ketoximino hydrolysable groups, such as vinyl tris(methylethylketoamino) silane. Particularly useful silanes include unsaturated silanes comprising an ethylenically unsaturated hydrocarboxyl group, such as vinyl, ally, isopropyl, butyl, cyclohexenyl or gamma-(meth)acryloxy allyl group, and a hydrolyzable group, such as, for example, a hydrocarbyloxy, hydrocarbonyloxy, or hydrocarbyl amino group. Examples of hydrolyzable groups include methoxy, ethoxy, formyloxy, acetoxy, propionyloxy, and alkyl or arylamino group. Preferred silanes are the unsaturated alkoxy silanes which can be grafted onto the interpolymer such as vinyl trimethoxy silane, vinyl triethoxy silane, gamma-(meth)acryloxy propyl trimethoxy silane, and mixtures thereof.

Suitable silanes also include those supplied by Witco Corp. under the designations: A-151, A-171, A-172, A-174, A-186, A-187, A-189, A-1100, A-1120, as defined in their Organo Silanes product brochure.

In some instances, at least a portion of the interpolymer of component (A) may be coupled to at least a portion of the filler of component (B) and/or (C)(1) without the express inclusion of component (C)(3). This is possible, for example, if the interpolymer of component (A) or the filler of component (B) and/or (C)(1) has a functional group, which inherently is capable of coupling. In other words, interpolymers and fillers may be prepared which are intrinsically capable of being coupled.

Component (C)(4).

The amount of component (C)(4) of the present invention may vary according to the end-use application in which the composition is to be employed. Component (C)(4) is not required to be present in the compositions of the present invention. However, if present, the amount of component (C)(4) generally comprises from about 0.1 to about 20 weight percent of the composition, preferably from about 0.1 to about 10 weight percent, more preferably from about 0.5 to about 5 weight percent.

Component (C)(4) also may vary according to the end-use application in which the composition is to be employed. Typically, component (C)(4) is selected from the group of hindered amine stabilizers. Such stabilizers include hindered triazines such as substituted triazines and reaction products of triazines. Suitable reaction products include the reaction product of triazine with, for example, diamines of cycloaliphatic compounds such as cyclohexane. A particularly suitable hindered amine stabilizer includes the reaction product of 1, 3-propanediamine, N,N"-1,2-ethanediylbis-cyclohexane and peroxidized N-butyl-2,2,6,6-tetramethyl-4-piperidinamine-2,4,6-trichloro-1,3,5-triazine which is made commercially by Ciba-Geigy and has the name "CGL-116" and the CAS Reg. No.: 191680-81-6.

Additional Polymeric Components.

The compositions of the present invention may optionally contain from 0.1 up to about 84.9, preferably up to about 50, more preferably up to about 30, additionally more preferably up to about 20, most preferably up to about 10 weight percent, of one or more further polymeric components, such as those described further below. However, the total amount of the ethylene and/or α-olefin/vinyl or vinylidene aromatic interpolymer(s) (A) and the inorganic filler(s) (B) and Component (C) generally is at least 50, preferably at least 70, more preferably at least 80, and most preferably at least 90 percent, based on the total weight of the composition of the present invention.

Preferred additional, optional polymers are vinyl or vinylidene aromatic polymers or styrenic block copolymers. The most preferred additional, optional polymers are homopolymers or interpolymers of ethylene and/or aliphatic α-olefins having from 3 to 20 carbon atoms or α-olefins having from 3 to 20 carbon atoms and containing polar groups.

Suitable vinyl or vinylidene aromatic polymers include homopolymers or interpolymers of one or more vinyl or vinylidene aromatic monomers, or interpolymers of one or more vinyl or vinylidene aromatic monomers and one or more monomers polymerizable therewith other than an aliphatic α-olefin. Suitable vinyl or vinylidene aromatic monomers are represented by the following formula:

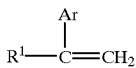

wherein $R^1$ and Ar have the meanings stated in formula I further above. Exemplary vinyl or vinylidene aromatic monomers are those listed under formula I further above, particularly styrene.

Examples of suitable polymerizable comonomers other than a vinyl or vinylidene aromatic monomer include, for example, $C_4$–$C_6$ conjugated dienes, especially butadiene or isoprene; ethylenically unsaturated nitriles such as acrylonitrile, methacrylonitrile, ethacrylonitrile, etc.; ethylenically unsaturated anhydrides such as maleic anhydride; ethylenically unsaturated amides such as acrylamide, methacrylamide etc.; ethylenically unsaturated carboxylic acids (both mono- and difunctional) such as acrylic acid and methacrylic acid, etc.; esters (especially lower, e.g. $C_1$–$C_6$, alkyl esters) of ethylenically unsaturated carboxylic acids such as methyl methacrylate, ethyl acrylate, hydroxyethylacrylate, n-butyl acrylate or methacrylate, 2-ethyl-hexylacrylate etc.; ethylenically unsaturated dicarboxylic acid imides such as N-alkyl or N-aryl maleimides such as N-phenyl maleimide, etc. Preferred monomers include maleic anhydride, methyl methacrylate, N-phenyl maleimide and acrylonitrile. In some cases it is also desirable to copolymerize a cross-linking monomer such as a divinyl benzene into the vinyl or vinylidene aromatic polymer.

The polymers of vinyl or vinylidene aromatic monomers with other polymerizable comonomers preferably contain, polymerized therein, at least 50 percent by weight and, preferably, at least 90 percent by weight of one or more vinyl or vinylidene aromatic monomers.

Styrene copolymers such as styrene-butadiene (SB) rubbers are particularly useful as an additional, optional polymer in the compositions of the present invention. Suitable SB rubbers include random, hydogenated and partially hydrogenated SB rubbers.

Preferred additional, optional polymers are homopolymers or interpolymers of ethylene and/or aliphatic α-olefins having from 3 to 20, preferably 3 to 18, more preferably 3 to 12, carbon atoms or α-olefins having from 3 to 20, preferably 3 to 18, more preferably 3 to 12, carbon atoms and containing polar groups.

Suitable aliphatic α-olefin monomers which introduce polar groups into the polymer include, for example, ethylenically unsaturated nitriles such as acrylonitrile, methacrylonitrile, ethacrylonitrile, etc.; ethylenically unsaturated anhydrides such as maleic anhydride; ethylenically unsaturated amides such as acrylamide, methacrylamide etc.; ethylenically unsaturated carboxylic acids (both mono- and difunctional) such as acrylic acid and methacrylic acid, etc.; esters (especially lower, e.g. $C_1$–$C_6$, alkyl esters) of ethylenically unsaturated carboxylic acids such as methyl methacrylate, ethyl acrylate, hydroxyethylacrylate, n-butyl acrylate or methacrylate, 2-ethyl-hexylacrylate etc.; ethylenically unsaturated dicarboxylic acid imides such as N-alkyl or N-aryl maleimides such as N-phenyl maleimide, etc. Preferably such monomers containing polar groups are acrylic acid, vinyl acetate, maleic anhydride and acrylonitrile. Halogen groups which can be included in the polymers from aliphatic α-olefin monomers include fluorine, chlorine and bromine; preferably such polymers are chlorinated polyethylenes (CPEs) or polyvinyl chloride. Preferred olefinic polymers for use in the present invention are homopolymers or interpolymers of ethylene and/or an aliphatic, including cycloaliphatic, α-olefin having from 3 to 18 carbon atoms. Suitable examples are homopolymers of ethylene or propylene, and interpolymers of two or more α-olefin monomers. Other preferred olefinic polymers are interpolymers of ethylene and one or more other α-olefins having from 3 to 8 carbon atoms. Preferred comonomers include 1-butene, 4-methyl-1-pentene, 1-hexene, and 1-octene.

The olefinic polymer may also contain, in addition to the α-olefin, one or more non-aromatic monomers polymerizable therewith. Such additional polymerizable monomers include, for example, $C_4$–$C_{20}$ dienes, preferably, butadiene or 5 ethylidene-2-norbomene. The olefinic polymers can be further characterized by their degree of long or short chain branching and the distribution thereof.

One class of olefinic polymers is generally produced by a high pressure polymerization process using a free radical initiator resulting in the traditional long chain branched low density polyethylene (LDPE). The LDPE employed in the present composition usually has a density of less than 0.94 g/cc (ASTM D 792) and a melt index of from 0.01 to 100, and preferably from 0.1 to 50 grams per 10 minutes (as determined by ASTM D-1238, Condition 190° C./2.16 kg (also known as $I_2$).

Another class is the linear olefin polymers which have an absence of long chain branching, as the traditional linear low density polyethylene polymers (heterogeneous LLDPE) or linear high density polyethylene polymers (HDPE) made using Ziegler polymerization processes (for example, U.S. Pat. No. 4,076,698 (Anderson et al.), sometimes called heterogeneous polymers.

HDPE consists mainly of long linear polyethylene chains. The HDPE employed in the present composition usually has a density of at least 0.94 grams per cubic centimeter (g/cc) as determined by ASTM Test Method D 1505, and a melt index (ASTM D-1238, Condition 190° C./2.16 kg (also known as $I_2$)) in the range of from 0.01 to 100, and preferably from 0.1 to 50 grams per 10 minutes.

The heterogeneous LLDPE employed in the present composition generally has a density of from 0.85 to 0.94 g/cc (ASTM D 792), and a melt index (ASTM D-1238, Condition 190° C./2.16 kg (also known as $I_2$)) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

A further class is that of the uniformly branched or homogeneous polymers (homogeneous LLDPE). The homogeneous polymers contain no long chain branches and have only branches derived from the monomers (if having more than two carbon atoms). Homogeneous polymers include those made as described in U.S. Pat. No. 3,645,992 (Elston), and those made using single-site catalysts in a reactor having relatively high olefin concentrations, as described in U.S. Pat. Nos. 5,026,798 and 5,055,438 (Canich). The uniformly branched/homogeneous polymers are those polymers in which the comonomer is randomly distributed within a given interpolymer molecule and wherein the interpolymer molecules have a similar ethylene/comonomer ratio within that interpolymer.

The homogeneous LLDPE employed in the present composition generally has a density of from 0.85 to 0.94 g/cc (ASTM D 792), and a melt index (ASTM D-1238, Condition 190° C./2.16 kg (also known as $I_2$)) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

Further, there is the class of substantially linear olefin polymers (SLOP) that may advantageously be used in component (B) of the blends of the present invention. These polymers process in a similar fashion to LDPE, but possess the strength and toughness of LLDPE. Similar to the traditional homogeneous polymers, the substantially linear ethylene/α-olefin interpolymers have only a single melting peak, as opposed to traditional Ziegler polymerized heterogeneous linear ethylene/α-olefin interpolymers which have two or more melting peaks (determined using differential scanning calorimetry). Substantially linear olefin polymers are disclosed in U.S. Pat. Nos. 5,380,810; 5,272,236; and 5,278,272; the entire contents of which are incorporated herein by reference.

The density of the SLOP as measured in accordance with ASTM D-792 is generally from 0.85 g/cc to 0.97, preferably from 0.85 g/cc to 0.955, and especially from 0.85 to 0.92 g/cc.

The melt index, according to ASTM D-1238, Condition 190° C./2.16 kg (also known as $I_2$), of the SLOP is generally from 0.01 to 1000, preferably from 0.01 to 100, and especially from 0.01 g/10 min. to 10 g/10 min.

Also, included are the ultra low molecular weight ethylene polymers and 10 ethylene/α-olefin interpolymers described in the WO patent application no. 97/01181 entitled Ultra-low Molecular Weight Polymers, filed on Jan. 22, 1997, which is incorporated herein by reference. These ethylene/α-olefin interpolymers have melt indices ($I_2$) greater than 1,000 g/10 min., or a number average molecular weight (Mn) less than 11,000.

The more preferred homopolymers or interpolymers of ethylene and/or aliphatic α-olefins having from 3 to about 20 carbon atoms and optionally containing polar groups are homopolymers of ethylene; homopolymers of propylene, copolymers of ethylene and at least other α-olefin containing from 4 to about 8 carbon atoms; copolymers of propylene and at least other α-olefin containing from 4 to about 8 carbon atoms; copolymers of ethylene and at least one of acrylic acid, vinyl acetate, maleic anhydride or acrylonitrile; copolymers of propylene and at least one of acrylic acid, vinyl acetate, maleic anhydride or acrylonitrile; and terpolymers of ethylene, propylene and a diene. Especially preferred are LDPE, HDPE, heterogeneous and homogeneous LLDPE, SLOP, polypropylene (PP), especially isotactic polypropylene and rubber-toughened polypropylenes, or ethylene-propylene interpolymers (EP), or ethylene-vinyl acetate copolymers, or ethylene-acrylic acid copolymers, or any combination thereof. Also preferred is polyethyleneterephthalate (PET).

Additional Components

The compositions of the present invention may contain one or more additives, for example, antioxidants (e.g., hindered phenols such as, for example, Irganox™ 1010 a registered trademark of Ciba Geigy), phosphites (e.g., Irgafos™ 168 a registered trademark of Ciba Geigy), U.V. stabilizers, cling additives (e.g.,; light stabilizers, such as hindered amines; plasticizers, such as dioctylphthalate or epoxidized soy bean oil; thermal stabilizers; mold release agents; tackifiers, such as hydrocarbon tackifiers; waxes, such as polyethylene waxes; processing aids, such as oils, organic acids such as stearic acid, metal salts of organic acids; crosslinking agents, such as peroxides or silanes; colorants or pigments to the extent that they do not interfere with desired physical or mechanical properties of the compositions of the present invention; and ignition retardant additives. Also, included in this invention, are gas phase flame retardant brominated and chlorinated agents. Typical of such compounds is decabromodiphenyl oxide. One skilled in the art would recognize and select the appropriate halogen agent depending on the desired performance of the composition. The above additives are employed in functionally equivalent amounts known to those skilled in the art, generally in amounts of up to about 30, preferably from about 0.01 to about 5, more preferably from about 0.02 to about 1 percent by weight, based upon the total weight of the composition.

A particularly desirable processing aid includes oxidized polyethylene. Oxidized polyethylene is available commercially from, for example, Allied Chemical under the tradename AC™6. A process-improving amount of oxidized polyethylene may often help to improve the compounding of the compositions of the present invention by lowering the torque or pressure required to compound and extrude the composition without adversely affecting the physical properties of the composition. Generally, the amount of oxidized polyethylene which may be required is from about 1 to about 10, preferably from about 2 to about 5 weight percent of the composition.

Method of Making the Compositions

The compositions of the present invention can be made by mixing or thermomixing, i.e. mixing at a temperature above the melting point of the interpolymer, the desired ingredients in any order by any convenient method, such as dry blending of interpolymer(s) of component (A), the filler(s) of component (B) and component (C) and subsequently melt mixing, either directly in the extruder used to make a finished article or by pre-melt mixing in a separate extruder (e.g., a Banbury mixer). Dry blends of the compositions can also be directly injection molded without pre-melt mixture.

If a coupling agent (C)(3) is to be employed then it is often preferable to add the coupling agent and any initiator simultaneously or sequentially during a compounding or extruding step. Alternatively, the coupling agent may be coated onto the filler of component (B) and, if present, component (C)(1) prior to mixing the components with the interpolymer(s) of component (A). An initiator may be added along with the coating, subsequent to the coating or both. In yet another alternative, the coupling agent may be coupled, i.e., grafted, onto the interpolymer of component (A) prior to compounding with the other components.

Articles of the Compositions.

The compositions of the present invention can be processed to fabricated articles by any suitable means known in the art. For example, the compositions can be processed to films or sheets or to one or more layers of a multilayered structure by know processes, such as calendering, blowing, casting or (co-)extrusion processes. Injection molded, compression molded, extruded or blow molded parts can also be prepared from the compositions of the present invention. Alternatively, the compositions can be processed to foams or fibers. Useful temperatures for processing the interpolymer(s) in combination with the filler(s) and optional additives to the fabricated articles generally are 100° C. to 300° C., preferably from 120° C. to 250° C., more preferably from 140° C. to 200° C.

The fabricated articles of the present invention may be foamed. The foam layer may be produced by an extrusion process or from expandable or foamable particles, moldable foam particles, or beads from which a sheet is formed by expansion and/or coalescing and welding of those particles.

A conventional extrusion foaming process may be used to make the foam structure. The structure is generally prepared by heating a polymer material to form a plasticized or melt polymer material, incorporating therein a known blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer or blender. The blowing agent is mixed with the melt polymer material at an elevated pressure sufficient to prevent substantial expansion of the melt polymer material and to generally disperse the blowing agent homogeneously therein.

Optionally, a nucleator may be blended in the polymer melt or dry blended with the polymer material prior to plasticizing or melting. The foamable gel is typically cooled to a lower temperature to optimize physical characteristics of the foam structure. The gel is then extruded or conveyed through a die of desired shape to a zone of reduced or lower pressure to form the foam structure. The die can have a substantially rectangular orifice to produce a sheet of the desired width and height. Alternatively, the die can have multiple orifices to produce polymer strands, which can be cut to beads. The zone of lower pressure is at a pressure lower than that in which the foamable gel is maintained prior to extrusion through the die. The lower pressure may be superatmospheric or subatmospheric (vacuum), but is preferably at an atmospheric level.

The foam structure may also be formed into foam beads suitable for molding into articles. To make the foam beads, discrete resin particles such as granulated resin pellets are suspended in a liquid medium in which they are substantially insoluble (such as water), impregnated with a blowing agent by introducing the blowing agent into the liquid medium at an elevated pressure and temperature in an autoclave or other pressure vessel; and rapidly discharged into the atmosphere or a region of reduced pressure to expand and form the foam beads. This process is taught in U.S. Pat. Nos. 4,379,859 and 4,464,484, which are incorporated herein by reference.

The foam beads may then be molded by any means known in the art, such as charging the foam beads to the mold, compressing the mold to compress the beads, and heating the beads such as with steam to effect coalescing and welding of the beads to form the article. Optionally, the beads may be impregnated with air or other blowing agent at an elevated pressure and temperature prior to charging to the mold. Further, the beads may be heated prior to charging. The foam beads may then be molded to sheets by a suitable molding method known in the art. Some of the methods are taught in U.S. Pat. Nos. 3,504,068 and 3,953,558.

Various additives may be incorporated in the foam structure, such as stability control agents, nucleating agents, pigments, antioxidants, acid scavengers, ultraviolet absorbers, flame retardants, processing aids or extrusion aids. Some of the additives are described in more detail above.

Fabricated articles of the present invention have a substantially improved hardness and tensile modulus while generally maintaining good elongation properties, such as elongation at break, stress at break and energy at break, as compared to fabricated articles made from one or more corresponding thermoplastic interpolymers without inclusion of a filler. Furthermore, the fabricated articles of the present invention generally have good thermal resistance and improved ignition resistance. Other beneficial properties include room temperature flexibility, and hot tear strength.

The compositions of the present invention can readily be coated, extruded, or layered onto a substrate. Typical substrates include glass, metal, ceramic, wood, polymer-based materials, natural fibers, matting, and mixtures thereof. Alternatively the compositions of the present invention can be extruded, milled, or calendered as unsupported films or sheets, for example for producing floor tiles, wall tiles, floor sheeting, wall coverings, or ceiling coverings. They are particularly useful as sound insulating or energy absorbing layers, films, sheets or boards. Films, sheets or boards of a wide thickness range can be produced. Depending on the intended end-use, useful thicknesses generally are from 0.5 to 20 mm, preferably from 1 to 10 mm. Alternatively, injection molded parts or blow molded articles, such as toys, containers, building and construction materials, automotive components, and other durable goods can be produced from the compositions of the present invention. Moreover, the compositions may be employed in cables, wire and cable assemblies, junction boxes, conduits, cable trays, cable supports, electrical unions and joints, or electrical devices, especially those in which ignition resistance is desirable.

The following examples are provided to illustrate the present invention. The examples are not intended to limit the scope of the present invention and they should not be so interpreted. Amounts are in weight parts or weight percentages unless otherwise indicated.

PREPARATION OF THE ETHYLENE/STYRENE INTERPOLYMERS (ESI's) 1–17

Preparation of Catalyst A; (dimethyl[N-(1,1-dimethylethyl)-1,1-dimethyl-1-[(1,2,3,4,5-η)-1,5,6,7-tetrahydro-3-phenyl-s-indacen-1-yl]silanaminato (2-)-N]-titanium)

1) Preparation of 3,5,6,7-Tetrahydro-s-Hydrindacen-1(2H)-one

Indan (94.00 g, 0.7954 moles) and 3-chloropropionyl chloride (100.99 g, 0.7954 moles) were stirred in $CH_2Cl_2$ (300 mL) at 0° C. as $AlCl_3$ (130.00 g, 0.9750 moles) was added slowly under a nitrogen flow. The mixture was then allowed to stir at room temperature for 2 hours. The volatiles were then removed. The mixture was then cooled to 0° C. and concentrated $H_2SO_4$ (500 mL) slowly added. The forming solid had to be frequently broken up with a spatula as stirring was lost early in this step. The mixture was then left under nitrogen overnight at room temperature. The mixture was then heated until the temperature readings reached 90° C. These conditions were maintained for a 2 hour period of time during which a spatula was periodically used to stir the mixture. After the reaction period crushed ice was placed in the mixture and moved around. The mixture was then transferred to a beaker and washed intermittently with $H_2O$ and diethylether and then the fractions filtered and combined. The mixture was washed with $H_2O$ (2×200 mL). The organic layer was then separated and the volatiles removed. The desired product was then isolated via recrystallization from hexane at 0° C. as pale yellow crystals (22.36 g, 16.3% yield).

$^1$H NMR (CDCl$_3$): d2.04–2.19 (m, 2 H), 2.65 (t, $^3J_{HH}$=5.7 Hz, 2 H), 2.84–3.0 (m 4 H), 3.03 (t, $^3J_{HH}$=5.5 Hz, 2 H), 7.26 (s, 1 H), 7.53 (s, 1 H). $^{13}$C NMR (CDCl$_3$): d25.71, 26.01, 32.19, 33.24, 36.93, 118.90, 122.16, 135.88, 144.06, 152.89, 154.36, 206.50. GC-MS: Calculated for $C_{12}H_{12}O$ 172.09, found 172.05.

2) Preparation of 1,2,3,5-Tetrahydro-7-phenyl-s-indacen.

3,5,6,7-Tetrahydro-s-Hydrindacen-1(2H)-one (12.00 g, 0.06967 moles) was stirred in diethylether (200 mL) at 0° C. as PhMgBr (0.105 moles, 35.00 mL of 3.0 M solution in diethylether) was added slowly. This mixture was then allowed to stir overnight at room temperature. After the reaction period the mixture was quenched by pouring over ice. The mixture was then acidified (pH=1) with HCl and stirred vigorously for 2 hours. The organic layer was then separated and washed with $H_2O$ (2×100 mL) and then dried over $MgSO_4$. Filtration followed by the removal of the volatiles resulted in the isolation of the desired product as a dark oil (14.68 g, 90.3% yield).

$^1$H NMR (CDCl$_3$): d2.0–2.2 (m, 2 H), 2.8–3.1 (m, 4 H), 6.54 (s, 1H), 7.2–7.6 (m 7 H). GC-MS: Calculated for $C_{18}H_{16}$ 232.13, found 232.05.

3) Preparation of 1,2,3,5-Tetrahydro-7-phenyl-s-indacene, dilithium salt.

1,2,3,5-Tetrahydro-7-phenyl-s-indacen (14.68 g, 0.06291 moles) was stirred in hexane (150 mL) as nBuLi (0.080 moles, 40.00 mL of 2.0 M solution in cyclohexane) was slowly added. This mixture was then allowed to stir overnight. After the reaction period the solid was collected via suction filtration as a yellow solid which was washed with hexane, dried under vacuum, and used without further purification or analysis (12.2075 g, 81.1% yield).

4) Preparation of Chlorodimethyl(1,5,6,7-tetrahydro-3-phenyl-s-indacen-1-yl)silane.

1,2,3,5-Tetrahydro-7-phenyl-s-indacene, dilithium salt (12.2075 g, 0.05102 moles) in THF (50 mL) was added dropwise to a solution of Me$_2$SiCl$_2$ (19.5010 g, 0.1511 moles) in THF (100 mL) at 0° C. This mixture was then allowed to stir at room temperature overnight. After the reaction period the volatiles were removed and the residue extracted and filtered using hexane. The removal of the hexane resulted in the isolation of the desired product as a yellow oil (15.1492 g, 91.1% yield).

$^1$H NMR (CDCl$_3$): d0.33 (s, 3 H), 0.38 (s, 3 H), 2.20 (p, $^3J_{HH}$=7.5 Hz, 2 H), 2.9–3.1 (m, 4 H), 3.84 (s, 1 H), 6.69 (d, $^3J_{HH}$=2.8 Hz, 1 H), 7.3–7.6 (m, 7 H), 7.68 (d, $^3J_{HH}$=7.4 Hz, 2 H). $^{13}$C NMR(CDCl$_3$): d0.24, 0.38, 26.28, 33.05, 33.18, 46.13, 116.42, 119.71, 127.51, 128.33, 128.64, 129.56, 136.51, 141.31, 141.86, 142.17, 142.41, 144.62. GC-MS: Calculated for $C_{20}H_{21}$ClSi 324.11, found 324.05.

5) Preparation of N-(1,1-Dimethylethyl)-1,1-dimethyl-1-(1,5,6,7-tetrahydro-3-phenyl-s-indacen-1-yl)silanamine.

Chlorodimethyl(1,5,6,7-tetrahydro-3-phenyl-s-indacen-1-yl)silane (10.8277 g, 0.03322 moles) was stirred in hexane (150 mL) as NEt$_3$ (3.5123 g, 0.03471 moles) and t-butylamine (2.6074 g, 0.03565 moles) were added. This mixture was allowed to stir for 24 hours. After the reaction period the mixture was filtered and the volatiles removed resulting in the isolation of the desired product as a thick red-yellow oil (10.6551 g, 88.7% yield).

$^1$H NMR (CDCl$_3$): d0.02 (s, 3 H), 0.04 (s, 3 H), 1.27 (s, 9 H), 2.16 (p, $^3J_{HH}$=7.2 Hz, 2 H), 2.9–3.0 (m, 4 H), 3.68 (s, 1 H), 6.69 (s, 1 H), 7.3–7.5 (m, 4 H), 7.63 (d, $^3J_{HH}$=7.4 Hz, 2 H). $^{13}$C NMR (CDCl$_3$): d-0.32, –0.09, 26.28, 33.39, 34.11, 46.46, 47.54, 49.81, 115.80, 119.30, 126.92, 127.89, 128.46, 132.99, 137.30, 140.20, 140.81, 141.64, 142.08, 144.83.

6) Preparation of N-(1,1-Dimethylethyl)-1,1-dimethyl-1-(1,5,6,7-tetrahydro-3-phenyl-s-indacen-1-yl) silanamine, dilithium salt.

N-(1,1-Dimethylethyl)-1,1-dimethyl-1-(1,5,6,7-tetrahydro-3-phenyl-s-indacen-1-yl)silanamine (10.6551 g, 0.02947 moles) was stirred in hexane (100 mL) as nBuLi (0.070 moles, 35.00 mL of 2.0 M solution in cyclohexane) was added slowly. This mixture was then allowed to stir overnight during which time no salts crashed out of the dark red solution. After the reaction period the volatiles were removed and the residue quickly washed with hexane (2×50 mL). The dark red residue was then pumped dry and used without further purification or analysis (9.6517 g, 87.7% yield).

7) Preparation of Dichloro[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium N-(1,1-Dimethylethyl)-1,1-dimethyl-1-(1,5,6,7-tetrahydro-3-phenyl-s-indacen-1-yl)silanamine, dilithium salt (4.5355 g, 0.01214 moles) in THF (50 mL) was added dropwise to a slurry of TiCl$_3$(THF)$_3$ (4.5005 g, 0.01214 moles) in THF (100 mL). This mixture was allowed to stir for 2 hours. PbCl$_2$ (1.7136 g, 0.006162 moles) was then added and the mixture allowed to stir for an additional hour. After the reaction period the volatiles were removed and the residue extracted and filtered using toluene. Removal of the toluene resulted in the isolation of a dark residue. This residue was then slurried in hexane and cooled to 0° C. The desired product was then isolated via filtration as a red-brown crystalline solid (2.5280 g, 43.5% yield).

$^1$H NMR (CDCl$_3$): d0.71 (s, 3 H), 0.97 (s, 3 H), 1.37 (s, 9 H), 2.0–2.2 (m, 2 H), 2.9–3.2 (m, 4 H), 6.62 (s, 1 H), 7.35–7.45 (m, 1 H), 7.50 (t, $^3J_{HH}$=7.8 Hz, 2 H), 7.75 (s, 1 H), 7.70 (d, $^3J_{HH}$=7.1 Hz, 2 H), 7.78 (s, 1 H). $^1$H NMR (C$_6$D$_6$): d0.44 (s, 3 H), 0.68 (s, 3 H), 1.35 (s, 9 H), 1.6–1.9 (m, 2 H), 2.5–3.9 (m, 4 H), 6.65 (s, 1 H), 7.1–7.2 (m, 1 H), 7.24 (t, $^3J_{HH}$=7.1 Hz, 2 H), 7.61 (s, 1 H), 7.69 (s, 1 H), 7.77–7.8 (m, 2 H). $^{13}$C NMR (CDCl$_3$): d1.29, 3.89, 26.47, 32.62, 32.84, 32.92, 63.16, 98.25, 118.70, 121.75, 125.62, 128.46, 128.55, 128.79, 129.01, 134.11, 134.53, 136.04, 146.15, 148.93. $^{13}$C NMR (C$_6$D$_6$): d0.90, 3.57, 26.46, 32.56, 32.78, 62.88, 98.14, 119.19, 121.97, 125.84, 127.15, 128.83, 129.03, 129.55, 134.57, 135.04, 136.41, 136.51, 147.24, 148.96.

8) Preparation of Dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium Dichloro[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium (0.4970 g, 0.001039 moles) was stirred in diethylether (50 mL) as MeMgBr (0.0021 moles, 0.70 mL of 3.0 M solution in diethylether) was added slowly. This mixture was then stirred for 1 hour. After the reaction period the volatiles were removed and the residue extracted and filtered using hexane. Removal of the hexane resulted in the isolation of the desired product as a golden yellow solid (0.4546 g, 66.7% yield).

$^1$H NMR (C$_6$D$_6$): d0.071 (s, 3 H), 0.49 (s, 3 H), 0.70 (s, 3 H), 0.73 (s, 3 H), 1.49 (s, 9 H), 1.7–1.8 (m, 2 H), 2.5–2.8 (m, 4 H), 6.41 (s, 1 H), 7.29 (t, $^3J_{HH}$=7.4 Hz, 2 H), 7.48 (s, 1 H), 7.72 (d, $^3J_{HH}$=7.4 Hz, 2 H), 7.92 (s, 1 H). $^{13}$C NMR (C$_6$D$_6$): d2.19, 4.61, 27.12, 32.86, 33.00, 34.73, 58.68, 58.82, 118.62, 121.98, 124.26, 127.32, 128.63, 128.98, 131.23, 134.39, 136.38, 143.19, 144.85.

Preparation of Catalyst B; (1H-cyclopenta[1]phenanthrene-2-yl)dimethyl(t-butylamido)-silanetitanium 1,4-diphenylbutadiene).

1) Preparation of lithium 1H-cyclopenta[1]phenanthrene-2-yl

To a 250 ml round bottom flask containing 1.42 g (0.00657 mole) of 1H-cyclopenta[1]phenanthrene and 120 ml of benzene was added dropwise, 4.2 ml of a 1.60 M solution of n-BuLi in mixed hexanes. The solution was allowed to stir overnight. The lithium salt was isolated by filtration, washing twice with 25 ml benzene and drying under vacuum. Isolated yield was 1.426 g (97.7 percent). 1H NMR analysis indicated the predominant isomer was substituted at the 2 position.

2) Preparation of (1H-cyclopenta[1]phenanthrene-2-yl)dimethylchlorosilane

To a 500 ml round bottom flask containing 4.16 g (0.0322 mole) of dimethyldichlorosilane (Me$_2$SiCl$_2$) and 250 ml of tetrahydrofuran (THF) was added dropwise a solution of 1.45 g (0.0064 mole) of lithium 1H-cyclopenta[1]phenanthrene-2-yl in THF. The solution was stirred for approximately 16 hours, after which the solvent was removed under reduced pressure, leaving an oily solid which was extracted with toluene, filtered through diatomaceous earth filter aid (Celite™), washed twice with toluene and dried under reduced pressure. Isolated yield was 1.98 g (99.5 percent).

3) Preparation of (1H-cyclopenta[1]phenanthrene-2-yl)dimethyl(t-butylamino)silane To a 500 ml round bottom flask containing 1.98 g (0.0064 mole) of (1H-cyclopenta[1]phenanthrene-2-yl)dimethylchlorosilane and 250 ml of hexane was added 2.00 ml (0.0160 mole) of t-butylamine. The reaction mixture was allowed to stir for several days, then filtered using diatomaceous earth filter aid (Celite™), washed twice with hexane. The product was isolated by removing residual solvent under reduced pressure. The isolated yield was 1.98 g (88.9 percent).

4) Preparation of dilithio (1H-cyclopenta[1]phenanthrene-2-yl)dimethyl(t-butylamido)silane To a 250 ml round bottom flask containing 1.03 g (0.0030 mole) of (1H-cyclopenta[1]phenanthrene-2-yl)dimethyl(t-butylamino)silane) and 120 ml of benzene was added dropwise 3.90 ml of a solution of 1.6 M n-BuLi in mixed hexanes. The reaction mixture was stirred for approximately 16 hours. The product was isolated by filtration, washed twice with benzene and dried under reduced pressure. Isolated yield was 1.08 g (100 percent).

5) Preparation of (1H-cyclopenta[1]phenanthrene-2-yl)dimethyl(t-butylamido)silanetitanium dichloride To a 250 ml round bottom flask containing 1.17 g (0.0030 mole) of TiCl$_3$·3THF and about 120 ml of THF was added at a fast drip rate about 50 ml of a THF solution of 1.08 g of dilithio (1H-cyclopenta[1]phenanthrene-2-yl)dimethyl(t-butylamido)silane. The mixture was stirred at about 20° C. for 1.5 h at which time 0.55 gm (0.002 mole) of solid PbCl$_2$ was added. After stirring for an additional 1.5 h the THF was removed under vacuum and the residue was extracted with toluene, filtered and dried under reduced pressure to give an orange solid. Yield was 1.31 g (93.5 percent).

6) Preparation of (1H-cyclopenta[1]phenanthrene-2-yl)dimethyl(t-butylamido)silanetitanium 1,4-diphenylbutadiene To a slurry of (1H-cyclopenta[1]phenanthrene-2-yl)dimethyl(t-butylamido)silanetitanium dichloride (3.48 g, 0.0075 mole) and 1.551 gm (0.0075 mole) of 1,4-diphenyllbutadiene in about 80 ml of toluene at 70° C. was add 9.9 ml of a 1.6 M solution of n-BuLi (0.0150 mole). The solution immediately darkened. The temperature was increased to bring the mixture to reflux and the mixture was maintained at that temperature for 2 hrs. The mixture was cooled to about −20° C. and the volatiles were removed under reduced pressure. The residue was slurried in 60 ml of mixed hexanes at about 20° C. for approximately 16 hours. The mixture was cooled to about −25° C. for about 1 hour. The solids were collected on a glass frit by vacuum filtration and dried under reduced pressure. The dried solid was placed in a glass fiber thimble and solid extracted continuously with hexanes using a Soxhlet extractor. After 6 hours a crystalline solid was observed in the boiling pot. The mixture was cooled to about −20° C., isolated by filtration from the cold mixture and dried under reduced pressure to give 1.62 g of a dark crystalline solid. The filtrate was discarded. The solids in the extractor were stirred and the extraction continued with an additional quantity of mixed hexanes to give an additional 0.46 g of the desired product as a dark crystalline solid.

Polymerization

ESI #'s 1, 2, 4–6, 8, 9, and 11–13, and 16–17 were prepared in a continuously operating loop reactor (36.8 gal). An Ingersoll-Dresser twin screw pump provided the mixing. The reactor ran liquid full at 475 psig (3,275 kPa) with a residence time of approximately 25 minutes. Raw materials and catalyst/cocatalyst flows were fed into the suction of the twin screw pump through injectors and Kenics static mixers. The twin screw pump discharged into a 2 inch diameter line which supplied two Chemineer-Kenics 10–68 Type BEM Multi-Tube heat exchangers in series. The tubes of these exchangers contained twisted tapes to increase heat transfer. Upon exiting the last exchanger, loop flow returned through the injectors and static mixers to the suction of the pump. Heat transfer oil was circulated through the exchangers' jacket to control the loop temperature probe located just prior to the first exchanger. The exit stream of the loop reactor was taken off between the two exchangers. The flow and solution density of the exit stream were measured by a Micro-Motion™ mass flow meter.

Solvent feed to the reactor was supplied by two different sources. A fresh stream of toluene from an 8480-S-E Pulsafeeder™ diaphragm pump with rates measured by a Micro-Motion™ mass flow meter was used to provide flush flow for the reactor seals (20 lb/hr (9.1 kg/hr). Recycle solvent was mixed with uninhibited styrene monomer on the suction side of five 8480-5-E Pulsafeeder™ diaphragm pumps in parallel. These five Pulsafeederm pumps supplied solvent and styrene to the reactor at 650 psig (4,583 kPa). Fresh styrene flow was measured by a Micro-Motion™ mass flow meter, and total recycle solvent/styrene flow was measured by a separate Micro-Motion™ mass flow meter. Ethylene was supplied to the reactor at 687 psig (4,838 kPa). The ethylene stream was measured by a Micro-Motion™ mass flow meter. A Brooks flow meter/controller was used to deliver hydrogen into the ethylene stream at the outlet of the ethylene control valve.

The ethylene/hydrogen mixture combined with the solvent/styrene stream at ambient temperature. The temperature of the entire feed stream as it entered the reactor loop was lowered to 2° C. by an exchanger with −10° C. glycol on the jacket. Preparation of the three catalyst components took place in three separate tanks. Fresh solvent and concentrated catalyst/cocatalyst premix were added and mixed into their respective run tanks and fed into the reactor via variable speed 680-S-AEN7 Pulsafeeder™ diaphragm pumps. As previously explained, the three component catalyst system entered the reactor loop through an injector and static mixer into the suction side of the twin screw pump. The raw material feed stream was also fed into the reactor loop through an injector and static mixer downstream of the catalyst injection point but upstream of the twin screw pump suction.

Polymerization was stopped with the addition of catalyst kill (water mixed with solvent) into the reactor product line after the Micro-Motion™ mass flow meter measuring the solution density. A static mixer in the line provided dispersion of the catalyst kill and additives in the reactor effluent stream. This stream next entered post reactor heaters that provided additional energy for the solvent removal flash. This flash occurred as the effluent exited the post reactor heater and the pressure was dropped from 475 psig (3,275 kPa) down to 450 mmHg (60 kPa) of absolute pressure at the reactor pressure control valve.

This flashed polymer entered the first of two hot oil jacketed devolatilizers. The volatiles flashing from the first devolatizer were condensed with a glycol jacketed exchanger, passed through the suction of a vacuum pump, and were discharged to the solvent and styrene/ethylene separation vessel. Solvent and styrene were removed from the bottom of this vessel as recycle solvent while ethylene exhausted from the top. The ethylene stream was measured with a Micro-Motion™ mass flow meter. The measurement of vented ethylene plus a calculation of the dissolved gases in the solvent/styrene stream were used to calculate the ethylene conversion. The polymer and remaining solvent separated in the devolatilizer was pumped with a gear pump to a second devolatizer. The pressure in the second devolatizer was operated at 5 mmHg (0.7 kPa) absolute pressure to flash the remaining solvent. This solvent was condensed in a glycol heat exchanger, pumped through another vacuum pump, and exported to a waste tank for disposal. The dry polymer (<1000 ppm total volatiles) was pumped with a gear pump to an underwater pelletizer with 6-hole die, pelletized, spin-dried, and collected in 1000 lb boxes.

ESI #'s 3, 7, 10, 14 and 15 were prepared in a 6 gallon (22.7 L), oil jacketed, Autoclave continuously stirred tank reactor (CSTR). A magnetically coupled agitator with Lightning A-320 impellers provided the mixing. The reactor ran liquid full at 475 psig (3,275 kPa). Process flow was in at the bottom and out of the top. Heat transfer oil was circulated through the jacket of the reactor to remove some of the heat of reaction. At the exit of the reactor was a Micro-Motion™ mass flow meter that measured flow and solution density. All lines on the exit of the reactor were traced with 50 psi (344.7 kPa) steam and insulated.

Toluene solvent was supplied to the reactor at 30 psig (207 kPa). The feed to the reactor was measured by a Micro-Motion™ mass flow meter. A variable speed diaphragm pump controlled the feed rate. At the discharge of the solvent pump, a side stream was taken to provide flush flows for the catalyst injection line (1 lb/hr (0.45 kg/hr)) and the reactor agitator (0.75 lb/hr (0.34 kg/ hr)). These flows were measured by differential pressure flow meters and controlled by manual adjustment of micro-flow needle valves. Uninhibited styrene monomer was supplied to the reactor at 30 psig (207 kPa). The feed to the reactor was measured by a Micro-Motion™ mass flow meter. A variable speed diaphragm pump controlled the feed rate. The styrene stream was mixed with the remaining solvent stream.

Ethylene was supplied to the reactor at 600 psig (4,137 kPa). The ethylene stream was measured by a Micro-Motion™ mass flow meter just prior to the Research valve controlling flow. A Brooks flow meter/controller was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to −5° C. by an exchanger with −5° C. glycol on the jacket. This stream entered the bottom of the reactor.

The three component catalyst system and its solvent flush also entered the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion™ mass flow meter. These streams combine with each other and the catalyst flush solvent just prior to entry through a single injection line into the reactor.

Polymerization was stopped with the addition of catalyst kill (water mixed with solvent) into the reactor product line after the Micro-Motion™ mass flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to ~250 mm of pressure absolute at the reactor pressure control valve. This flashed polymer entered a hot oil jacketed devolatilizer. Approximately 85 percent of the volatiles were removed from the polymer in the devolatilizer. The volatiles exited the top of the devolatilizer. The stream was condensed with a glycol jacketed exchanger and entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion™ mass flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

ESI #18 was prepared in a 400 gallon (1514 L) agitated semi-continuous batch reactor. The reaction mixture consisted of approximately 250 gallons (946 L) of a solvent comprising 252 lbs (114 kg) of a mixture of cyclohexane (85 wt %) and isopentane (15 wt %), and 1320 lbs (599 kg) styrene. Prior to addition, solvent, styrene and ethylene were purified to remove water and oxygen. The inhibitor in the styrene was also removed. Inerts were removed by purging the vessel with ethylene. The vessel was then pressure controlled to a set point with ethylene. Temperature in the vessel was controlled to set-point (60° C.) by varying the jacket water temperature on the vessel. Prior to polymerization, the vessel was heated to the desired run temperature and the catalyst components Titanium: (N-1,1-dimethylethyl)dimethyl(1-(1,2,3,4,5-η)-2,3,4,5-tetramethyl-2,4-cyclopentadien-1-yl)silanaminato))(2-)N)-dimethyl, CAS# 135072-62-7 and Tris(pentafluoro-phenyl) boron, CAS# 001109-15-5, Modified methylaluminoxane Type 3A, CAS# 146905-79-5 were flow controlled, on a mole ratio basis of 1/3/5 respectively, combined and added to the vessel. After starting, the polymerization was allowed to proceed with ethylene supplied to the reactor as required to maintain vessel pressure of 42 psig (290 kPa). At the end of the run (2.8 hr), the solution polymer concentration was 11.5 wt %. The catalyst flow was then stopped, ethylene was removed from the reactor, about 1000 ppm of Irganox™ 1010 anti-oxidant was then added to the solution and the polymer was isolated from the solution. The resulting polymers were isolated from solution by steam stripping. In the case of the steam stripped material, additional processing was required in extruder like equipment to reduce residual moisture and any unreacted styrene.

The various catalysts, co-catalysts and process conditions used to prepare the various individual ethylene styrene interpolymers (ESI #'s 1–17) are summarized in Table 1 and the properties of ESI #'s 1–18 are summarized in Table 2.

TABLE 2

Properties of ESI #'s 1–18.

| ESI # | Copolymer Styrene (wt %) | Copolymer Styrene (mol %) | Actactic Polystyrene (wt %) | $I_2$ (g/10 min) |
|---|---|---|---|---|
| ESI 1 | 34.5 | 12.5 | 2.6 | 1.0 |
| ESI 2 | 67.6 | 36.2 | 3.4 | 0.9 |
| ESI 3 | 24.9 | 8.2 | 0.2 | N/A |
| ESI 4 | 30.0 | 10.3 | 0.4 | 1.0 |
| ESI 5 | 71.0 | 39.7 | 4.6 | 1.2 |
| ESI 6 | 59.9 | 28.7 | 1.6 | 0.6 |
| ESI 7 | 28.5 | 9.7 | 0.2 | N/A |
| ESI 8 | 38.0 | 14.2 | 8.0 | 0.8 |
| ESI 9 | 68.9 | 37.4 | 2.8 | 4.0 |
| ESI 10 | 27.7 | 9.3 | 0.3 | N/A |
| ESI 11 | 41.2 | 15.9 | 0.4 | 0.8 |
| ESI 12 | 31.2 | 10.9 | 0.6 | 1.0 |
| ESI 13 | 76.1 | 46.2 | 7.0 | 6.8 |
| ESI 14 | 73.0 | 42.1 | 2.7 | 1.0 |
| ESI 15 | 42.0 | 16.3 | 0.8 | 3.5 |
| ESI 16 | 70.0 | 38.6 | 4.7 | 0.8 |
| ESI 17 | 30.0 | 10.3 | 0.2 | 1.0 |
| ESI 18 | 74.2 | 43.6 | 9.4 | 0.18 |

The properties of the polymers and compositions are determined by the following test procedures.

TESTING

Melt Index (MI)

Melt Index (MI) was determined by ASTM D-1238 (1979), Condition E (190° C.; 2.16 kg).

Styrene Analyses

Interpolymer styrene content and atactic polystyrene concentration were determined using proton nuclear magnetic resonance ($^1$H N.M.R). All proton NMR samples were prepared in 1, 1, 2, 2-tetrachloroethane-d$_2$ (TCE-d$_2$). The resulting solutions were 1.6–3.2 percent polymer by weight.

TABLE 1

Preparation Conditions for ESI #'S 1–17

| ESI # | Reactor Temp ° C. | Solvent Flow lb/hr | Ethylene Flow lb/hr | Hydrogen Flow sccm | Styrene Flow lb/hr | Ethylene Conversion % | B/Ti Ratio | MMAO$^e$/Ti Ratio | Catalyst | Co-Catalyst |
|---|---|---|---|---|---|---|---|---|---|---|
| ESI 1 | 95.0 | 404 | 41 | 582 | 42 | 93 | 5.2 | 6.5 | C | D |
| ESI 2 | 74.1 | 283 | 35 | 238 | 123 | 92 | 4.4 | 15.1 | B | D |
| ESI 3 | 100.8 | 32.00 | 3.67 | 34 | 2.4 | 92.39 | 5.00 | 5 | B | D |
| ESI 4 | 100.0 | 329 | 62 | 1198 | 33 | 96 | 4.3 | 8.2 | B | D |
| ESI 5 | 73.0 | 265 | 34 | 900 | 139 | 92 | 6.0 | 12.0 | B | D |
| ESI 6 | 82.9 | 307 | 44 | 82 | 92 | 94 | 6.0 | 16.0 | B | D |
| ESI 7 | 96.2 | 38.4 | 4.8 | 44 | 3.7 | 93.02 | 2.99 | 5 | B | D |
| ESI 8 | 85 | 350 | 51 | 1494 | 89 | 91 | 3.5 | 5.0 | C | D |
| ESI 9 | 90 | 261 | 34 | 1378 | 115 | 93 | 6.0 | 15.0 | B | D |
| ESI 10 | 104.1 | 37.25 | 4.61 | 49.8 | 3.7 | 92.67 | 2.95 | 3.2 | B | D |
| ESI 11 | 105.0 | 664 | 123 | 1520 | 112 | 94 | 3.5 | 6.0 | B | D |
| ESI 12 | 115.0 | 546 | 92 | 394 | 67 | 94 | 3.5 | 6.0 | B | D |
| ESI 13 | 80.0 | 160 | 27 | 1668 | 155 | 96 | 6.2 | 12.0 | B | D |
| ESI 14 | 79.5 | 41.01 | 2.17 | 3.5 | 21 | 96.79 | 3.52 | 6. | A | D |
| ESI 15 | 79.5 | 41.01 | 2.17 | 3.5 | 21 | 96.79 | 3.52 | 6 | A | D |
| ESI 16 | 73.5 | 281 | 34 | 250 | 122 | 93 | 4.2 | 15.0 | B | D |
| ESI 17 | 110.1 | 398 | 66 | 265 | 40 | 95 | 5.3 | 10.0 | B | D | a Catalyst A is dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]-titanium.
b Catalyst B is ;(1H-cyclopenta[1]phenanthrene-2-yl)dimethyl(t-butylamido)-silanetitanium 1,4-diphenylbutadiene)
c Catalyst C is (t-butylamido)dimethyl(tetramethylcyclopentadienyl)silane-titanium (II) 1,3-pentadiene prepared as in U.S. PAT. NO. 5,556,928, Ex. 17.
d Cocatalyst D is tris(pentafluorophenyl)borane, (CAS #001109-15-5),.
e a modified methylaluminoxane commercially available from Akzo Nobel as MMAO-3A (CAS #146905-79-5)

Melt index ($I_2$) was used as a guide for determining sample concentration. Thus when the $I_2$ was greater than 2 g/10 min, 40 mg of interpolymer was used; with an $I_2$ between 1.5 and 2 g/10 min, 30 mg of interpolymer was used; and when the $I_2$ was less than 1.5 g/10 min, 20 mg of interpolymer was used. The interpolymers were weighed directly into 5 mm sample tubes. A 0.75 mL aliquot of TCE-$d_2$ was added by syringe and the tube was capped with a tight-fitting polyethylene cap. The samples were heated in a water bath at 85° C. to soften the interpolymer. To provide mixing, the capped samples were occasionally brought to reflux using a heat gun.

Proton NMR spectra were accumulated on a Varian VXR 300 with the sample probe at 80° C., and referenced to the residual protons of TCE-$d_2$ at 5.99 ppm. The delay times were varied between 1 second, and data was collected in triplicate on each sample. The following instrumental conditions were used for analysis of the interpolymer samples:

Varian VXR-300, standard $^1$H:
Sweep Width, 5000 Hz
Acquisition Time, 3.002 sec
Pulse Width, 8 $\mu$sec
Frequency, 300 MHz
Delay, 1 sec
Transients, 16

The total analysis time per sample was about 10 minutes.

Initially, a $^1$H NMR spectrum for a sample of the polystyrene, Styron™ 680 (available from and a registered trademark of the Dow Chemical Company, Midland, Mich.) was acquired with a delay time of one second. The protons were "labeled": b, branch; a, alpha; o, ortho; m, meta; p, para, as shown in Figure 1.

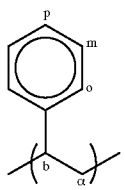

Figure 1

Integrals were measured around the protons labeled in Figure 1; the 'A' designates aPS. Integral $A_{7.1}$ (aromatic, around 7.1 ppm) is believed to be the three ortho/para protons; and integral $A_{6.6}$ (aromatic, around 6.6 ppm) the two meta protons. The two aliphatic protons labeled $\alpha$ resonate at 1.5 ppm; and the single proton labeled b is at 1.9 ppm. The aliphatic region was integrated from about 0.8 to 2.5 ppm and is referred to as $A_{al}$. The theoretical ratio for $A_{7.1}$:$A_{6.6}$:$A_{al}$ is 3:2:3, or 1.5:1:1.5, and correlated very well with the observed ratios for Styron™ 680 (available from and a registered trademark of the Dow Chemical Company, Midland, Mich. for several delay times of 1 second. The ratio calculations used to check the integration and verify peak assignments were performed by dividing the appropriate integral by the integral $A_{6.6}$ Ratio $A_r$ is $A_{7.1}/A_{6.6}$.

Region $A_{6.6}$ was assigned the value of 1. Ratio Al is integral $A_{al}/A_{6.6}$. All spectra collected have the expected 1.5:1:1.5 integration ratio of (o+p):m:($\alpha$+b). The ratio of aromatic to aliphatic protons is 5 to 3. An aliphatic ratio of 2 to 1 is predicted based on the protons labeled $\alpha$ and b respectively in FIG. 1. This ratio was also observed when the two aliphatic peaks were integrated separately.

For the ethylene/styrene interpolymers, the $^1$H NMR spectra using a delay time of one second, had integrals $C_{7.1}$, $C_{6.6}$, and $C_{al}$ defined, such that the integration of the peak at 7.1 ppm included all the aromatic protons of the copolymer as well as the o&p protons of aPS. Likewise, integration of the aliphatic region $C_{al}$ in the spectrum of the interpolymers included aliphatic protons from both the aPS and the interpolymer with no clear baseline resolved signal from either polymer. The integral of the peak at 6.6 ppm $C_{6.6}$ is resolved from the other aromatic signals and it is believed to be due solely to the aPS homopolymer (probably the meta protons). (The peak assignment for atactic polystyrene at 6.6 ppm (integral $A_{6.6}$) was made based upon comparison to the authentic sample Styron™ 680 (available from and a registered trademark of the Dow Chemical Company, Midland, Mich.)). This is a reasonable assumption since, at very low levels of atactic polystyrene, only a very weak signal is observed here. Therefore, the phenyl protons of the copolymer must not contribute to this signal. With this assumption, integral $A_{6.6}$ becomes the basis for quantitatively determining the aPS content.

The following equations were then used to determine the degree of styrene incorporation in the ethylene/styrene interpolymer samples:

(C Phenyl)=$C_{7.1}$+$A_{7.1}$-(1.5×$A_{6.6}$)
(C Aliphatic)=$C_{al}$-(15×$A_{6.6}$)
$s_c$=(C Phenyl)/5
$e_c$=(C Aliphatic-(3×$s_c$))/4
E=$e_c$/($e_c$+$s_c$)
$S_c$=$s_c$/($e_c$+$s_c$)

and the following equations were used to calculate the mol % ethylene and styrene in the interpolymers.

$$\text{Wt \% } E = \frac{E*28}{(E*28)+(S_c*104)}(100)$$

and $$\text{Wt \% } S = \frac{S_c*104}{(E*28)+(S_c*104)}(100)$$

where: $s_c$ and $e_c$ are styrene and ethylene proton fractions in the interpolymer, respectively, and $S_c$ and E are mole fractions of styrene monomer and ethylene monomer in the interpolymer, respectively.

The weight percent of aPS in the interpolymers was then determined by the following equation:

$$\text{Wt \% } aPS = \frac{(\text{Wt \% } S)*\left(\frac{A_{6.6}}{2}\right)}{100+\left[(\text{Wt \% } S)+\left(\frac{\frac{A_{6.6}}{2}}{S_c}\right)\right]}*100$$

The total styrene content was also determined by quantitative Fourier Transform Infrared spectroscopy (FTIR).

Physical Testing

The tensile and elongation at break data were obtained according to BS EN 60811-1-1:1995. The cold tear data were obtained according to BS 6469:Section 99.1:1992. The hot tear data were obtained according to BS 6469:Section 99.1:1992, except that the samples were conditioned at 70° C.+/-2° C. for 12 minutes, and tested in the conditioning chamber. For the TS and EB, the rate of grip separation was 250 mm min$^{-1}$ and gauge length 20 mm, and for the tear measurements the rate of grip separation was 400 mm min$^{-1}$ on trouser tear samples.

The flexibility data were obtained using a three-point bend technique, based upon test method 1 in the ASTM standard D790-92 (British Plastics and Rubber, March 1982, p 50). The experiments were performed using a 3-point bend rig in a tensile machine. The 12 mm wide, 3 mm thick samples were bent at a rate of 10 mm min$^{-1}$. Where the stress/strain plot showed curvature even at low strain, the rate of grip separation was reduced to 2 mm min$^{-1}$. The load required to deform the test bar a distance to 1.5 times its thickness was measured for a series of samples. The greater the load, the stiffer the material. The Elastic Modulus of Flexure was obtained from the equation given below.

$$\text{Elastic Modulus of Flexure (MPa)} = \frac{(\text{length of sample between outer jig supports})^3 (\text{load required to displace sample to } 1.5 \times \text{thickness})}{4 \times (\text{width}) \times (\text{thickness})^3 (1.5 \times \text{thickness})}$$

$$\text{ie} \frac{(\text{length of sample between outer jig supports})^3 \cdot \text{slope of linear part of stress/strain curve}}{4 \times (\text{width}) \times (\text{thickness})^3}$$

Hardness

Hardness was measured using a Hardness Tester for Shore D according to ASTM D2240-97.

Compounding

The compositions for Examples 1, 2, 5, 6, 8–17 and 36–40 and Comparative Examples 1, 2, 4, 8, were prepared on the Carter Internal Mixer as follows:

The polymer and about 50% of the intended ATH loading were dry tumble-blended together. With rotors set at 30 rpm all the polymer mixture (with about half the filler) was added, after 4–5 minutes when the temperature was above about 70° C., the remaining filler was added and after 10 minutes, and at a temperature of over 90° C., the antioxidants and other additives were added. After 15 minutes, with the temperature in the range of 100–140° C., the mix was dropped and polymeric sheet milled in the usual way.

The compositions for Examples 3, 4, 7, 18, 19, 30–35 and Comparative Examples 5, 6, and 9 were prepared on the Buss KoKneader using the following procedure:

The following temperatures were set;

| | |
|---|---|
| Kneader screw | 60° C. |
| Zones 1 and 2 | 65° C. |
| Zone 3 | 40° C. |
| Discharge screw | 100° C. |
| Discharge barrel | 100° C. |
| Discharge temperature | 130° C. |

The polymer, additives (the additives would normally include the supported vinyl silane coupling agent, the supported peroxide, the antioxidants (either neat or in a master batch), processing aid, etc.) and half the filler were dry tumble-blended together, then added to the compounder in zone 1, and the rest of the filler added into zone 2. The kneader screw speed was 150 rpm and the discharge screw speed was 45 rpm. Material leaving the kneader barrel was at a temperature of at least 150° C. as it passed into the discharge barrel. The material was cooled further after leaving the discharge extruder and before being pelletized.

The compositions for Examples 41 to 54 were prepared on a Werner Pfleiderer Internal Mixer. A typical procedure was as follows:

1) the Interpolymer and additives were dry-blended together.

2) the mixing bowl was oil heated, and the oil bath was set at 120° C. to 180° C.

3) 1000 g of the pre-blend were charged to the mixing bowl 4) mixing time was typically 10 to 14 minutes.

5) the melt temperature of the mix was about 105° C. to 147° C.

6) the blend was removed from the bowl and cooled, chopped, and hot pressed into test specimens.

Comp Ex 10 and Examples 55–60 were produced on 3 liter Moriyama Model D3-7.5 compounder, using the following procedure: Powders were loaded and then followed by polymer(s) and additives. The mixture was allowed to flux for 4 to 6 minutes before the batch was dropped. The mixing temperature was 80° C. to 160° C.

Comparative Ex 11, Examples 20–29, and Examples 61–62 were produced on a Haake blender using the following procedure: Polymer(s) were mixed until melted (2 to 3 minutes) and then powders were added and mixed for 10 to 15 minutes. Bowl temperature was set to 160° C. to 170° C. Examples 63–67 were also prepared on a Haake blender at 170° C. and 40 rpm. The blends were melted at 190° C. for 3 minutes and compression molded into ⅛" thick plaques at 190° C. under 20,000 lb. of pressure for another 2 minutes for subsequent LOI and UL-94 flammability testing.

Extrusion Process:

Extrusions for Example 19 and Comparative Examples 7–9 were performed on a Braebender single screw extruder, equipped with a tape die, at 160° C. and 10 rpm. The torque was measured on the Brabender extruder; tape samples were collected to measure surface quality and mechanical properties. The extruder motor amperage was used as a measure of the difficulty of extrusion.

The Specific Resistivity and Insulation K-Values for Example 18 and Comparative Example 6 were measured from polymer coated wires. The polymeric formulations were extrusion coated onto wires using a General Electric 38 mm extruder, equipped with a low compression PVC screw, at 10 rpm with a temperature profile of 130–165° C. and a line speed of 7 m min$^{-1}$.

Plaque Samples

Unless otherwise stated, where compounds were pressed into plaque form, this was achieved by compression molding at 160° C., 3 minutes at low pressure and 6 minutes at high pressure before cooling to ambient.

Electrical Testing

This was performed on 5 m lengths of sample, with 15 cm excess on either end. The samples were immersed in water at 70° C. and stressed at 600V AC and 50 Hz. The insulation resistance at 500V DC was measured as a function of time. The specific resistivity was given by:

$$\text{Specific resistivity } (\Omega \cdot m) = r.2\pi.l/\ln(D/d) \quad \text{equation 1}$$

where r=measured resistance in Ω l=length tested in meters

D=outer diameter d=inner diameter

The method of calculating the insulation resistant constant (K) uses the formula in BS 6469:Section 99.2:1992 given below:

$$K(M\Omega \cdot km) = R.1/1000 \log_{10}(D/d) \quad \text{equation 2}$$

where l=length in meters

R=measured resistance in MΩ

D/d=ratio of diameters

Fire Tests

Temperature Index values were obtained using BS2782:pt 1:Method 143B: 1989 (equivalent to ISO 4589, parts 1–3). Limiting oxygen index (LOI) values were obtained via ASTM D2863 using a Rheometric Scientific 16,000 LOI instrument. The smoke data from the NBS smoke chamber were obtained using BS6401:1983 using 3 mm thick plaque samples with the equipment in flaming mode. ULV classifications were determined using the Underwriters Laboratory "Tests For Flammability Of Plastic Materials In Devices And Appliances" test, UL94-V. FMVSS 302 Flame Spread ratings were obtained using Federal Motor Vehicle Safety Standard 302 (FMVSS 302).

Cold Bend Tests at –15° C. and –40° C.

10 cm lengths of sample were wound around a mandrel 10 times their diameter and placed in a temperature controlled oven at either –15° C. or –40° C. for a period of one hour. After this time the samples were removed and wound in the opposite direction. Samples passed the test if no cracks were observed after a further conditioning period of one hour.

Aging Tests

These were performed according to BS EN 60811-1-2:1995 at the specified temperature for seven days. The rate of grip separation was 250 mm min$^{-1}$ and gauge length 20 mm.

These were performed according to BS EN 60811-1-3:1995 at 70° C. for eight days.

Hot Pressure Test

These were performed according to BS EN 60811-3-1:1995, using a K-value of 0.6 (as defined in the hot pressure test). These were performed according to BS EN 60811-1-3:1995 at 70° C. for eight days.

Hot Pressure Test

These were performed according to BS EN 60811-3-1:1995, using a K-value of 0.6 (as defined in the hot pressure test).

Viscosity Measurements

Viscosity measurements were measured conventionally on a Dynamic Mechanical Spectrometer at 150° C.

Formulation Components:

Silquest™ RC-1 vinyl alkoxysilane is a tradename of and available from Witco Corp.

Trigonox™ T29B40 alkyl peroxide is a tradename of and available from Akzo Chemie BV.

Hubercarb™ M-3 is a tradename of and available from J. M. Huber Corporation.

EVA 1 is Elvax™ 360, ethylvinylacetate polymer containing 25 wt % vinyl acetate and is a tradename of and available from the Du Pont Chemical Co.

POE 1 is an Engage™ 8003, an ethylene/octene polyolefin elastomer, product and trademark of Du Pont Dow Elastomers.

f-PVC1 is PVC GDI/798 available from the European Vinyl Corporation.

PVC2 is PVC GDI/704 available from the European Vinyl Corporation.

IRPS1 is STYRON™ 6075 polystyrene (a trademark of and available from the Dow Chemical Company).

GPPS1 is STYRON™ 685D polystyrene (a trademark of and available from The Dow Chemical Company).

CGL-116 is made commercially by Ciba-Geigy and has the CAS Reg No. 191680-81-6.

Comadd™ DSE 40 is a trademark of and available from Brugge Compounds.

AC™ 6 is a trademark of and available from AlliedSignal Inc.

Primacor™ 1430 is an ethylene/acrylic acid copolymer and a trademark of and available from The Dow Chemical Company.

Primacor™ 3460 Copolymer is an ethylene/acrylic acid copolymer and a trademark of and available from The Dow Chemical Company.

EVA 5 is Elvax™ 766 EVA is a trademark of and available from the Du Pont Chemical Company.

EVA 6 is Escorene™ UL7765 EVA is a trademark of and available from Exxon Chemical.

Nordel™ 465A is a trademark of and available from DuPont Dow Elastomers

Exxelor™ 1801 is a trademark of and available from Exxon Chemical.

Proflow™ 3000 polypropylene is a trademark of and available from Polyvision.

Hydral™ 710 ATH is a trademark of and available from Alcoa.

Hydral™ 712 ATH is a trademark of and available from Alcoa.

SFR-100 Silicone is a trademark of and available from General Electric.

EXAMPLES 1–5 AND COMPARATIVE EXAMPLES 1–3

A series of compositions were prepared comprising ethylene styrene interpolymers and ATH, some of which were coupled using a vinylsilane coupling aagent. These formulations were chosen because they represent typical compositions that could be used to make ignition resistant wall covering and low voltage wire insulation. The interpolymers used, and the ATH levels employed, give particularly good mechanical properties in the above-mentioned applications. The formulations were both coupled and non-coupled, as would benefit the applications. The samples were then submitted for smoke chamber testing. The resulting data are summarized in Table 3. The data in Table 3 demonstrate that, even with substantially random interpolymers with high styrene content, it is possible to achieve smoke densities below that of PVC and equivalent to those of non-styrene containing polymers such as EVA and E/O. These data further surprisingly demonstrate that major changes in the interpolymer composition, from about 25 wt. % styrene to about 68 wt. % styrene, do not detrimentally affect smoke generation properties; and that various interpolymers can be used, to impart the desired mechanical properties to the application, without adverse effects.

EXAMPLES 6–17 AND COMPARATIVE EXAMPLES 4–5

A further series of compositions were prepared comprising ethylene styrene interpolymers and ATH, some of which were coupled using a vinylsilane coupling agent. These particular compositions were chosen because they represent compositions that could be suitable for floor covering and low voltage wire insulation. The ignition resistance of these formulations was modified by varying the levels of the ATH employed. The samples were then submitted for tear strength testing. The resulting data are summarized in Table 4. The data in Table 4 demonstrate that with a coupler there is no major decrease in tear strength at high temperature compared to ambient (Ex 7) as there is with EVA (comp Expt. 5). All remaining Examples show good tear strength. In addition a comparison of Examples 6 and 7 shows that coupled ESI compositions show a major decrease in Flexural Modulus resulting in improved flexibility. This combination of high tear strength and good flexibility renders the materials excellent PVC replacements. These data further show that, surprisingly, wide ranges of filler can be used in the interpolymer formulations without adverse effects in toughness, as measured by the tear strength.

EXAMPLE 18 AND COMPARATIVE EXAMPLES 6

A composition was prepared comprising an ethylene styrene interpolymer, ATH with a silane coupling agent and peroxide and compared with a PVC formulation commonly used in low voltage ignition resistant wire insulation. The interpolymer formulation was chosen to meet typical Low Smoke and Fume (LSF) insulation mechanical, electrical, and ignition resistance properties. The samples were then submitted for a number physical and electrical property tests. The resulting data are summarized in Table 5. The data in Table 5 demonstrate that the coupled ESI materials can act as suitable PVC replacements. Thus the interpolymer formulations can be modified, by varying the interpolymer composition, the filler type and loading, and the coupling level and type, to give selected application performance while maintaining surprisingly excellent mechanical and ignition resistance properties.

EXAMPLE 19 AND COMPARATIVE EXAMPLES 7–9

A composition was prepared comprising an ethylene styrene interpolymer and ATH, again coupled using a vinyl-silane coupling agent and its processability as measured by the smoothness of the surface on extrusion was compared with formulations comprising PVC or EVA or a polyolefin elastomer. High filler loadings, in thermoplastic compositions, often cause extrusion problems, one of which is in the surface quality of the extrudate. These formulations were chosen with a particularly high ATH loading known to cause surface imperfections when extruded in thermoplastic elastomeric materials; the extrusion conditions were chosen to enhance this detrimental effect. The samples were then submitted for extrusion and evaluation of the surface smoothness. The resulting data are summarized in Table 6. The data in Table 6 demonstrate that although Comparative Examples 7, and 9 all have the same ATH level and are all coupled, only the ESI sample (Ex 19) gives as smooth a surface as PVC. These data surprisingly show that the filled substantially random interpolymer compositions of this invention have excellent surface quality even when extruded under adverse conditions.

TABLE 3

Smoke Chamber Data*

| | | BS 6401 NBS Smoke Density Data | |
|---|---|---|---|
| Sample | Polymer Composition | Smoke Density (Dmin) | Time-to-Dmin (minutes) |
| Ex 1. | 32.5 wt. % ESI 1 and 67.5 wt. % ATH {1} | 55 | 20 |
| Ex 2. | 50 wt. % ESI 1 and 50 wt. % ATH {1} | 122 | 17 |
| Ex 3. | 32.5 wt. % ESI 2 and 67.5 wt. % ATH {1,2,3} | 207 | 17.5 |
| Ex 4. | 32.5 wt. % ESI 2 and 67.5 wt. % ATH {1,2,4} | 181 | 16.5 |
| Ex 5. | 32.5 wt. % ESI 3 and 67.5 wt. % ATH {1} | 103 | 18.5 |
| Comp Ex 1 | 32.5 wt. % POE 1 and 67.5 wt. % ATH {1} | 69 | 20 |
| Comp Ex 2 | 32.5 wt. % EVA 1 (25% Vinyl Acetate) and 67.5 wt. % ATH {1} | 129 | 16 |
| Comp Ex 3 | f-PVC 1 | 870 | 6.5 |

*ATH is Alcan SF 7E ™ Aluminim Trihydrate, Particle size 0.8 = μm, tradename of and available from Alcan Corp.
{1} - 0.1 wt % Irganox 1010 and 0.05 wt. % Irganox MD 1024
{2} - 1.25 wt % Comadd DSE 40 vinylsilane, tradename of and available from Brugge Compounds
{3} - 0.6 wt. % Trigonox 29B40
{4} - 1 wt. % Trigonox 29B40

TABLE 4

Tear Data*

| Sample | Composition | Flexural Modulus (MPa) | Tear Strength (N/mm) | Hot Tear Strength (N/mm) at 70° C. | General Comments on the compound |
|---|---|---|---|---|---|
| Ex 6 | 35 wt. % ESI 1 and 65 wt. % ATH | 135 | 6.9 | 2.5 | nothing unusual |
| Ex 7 | 35 wt. % ESI 1 and 65 wt. % ATH {1} | 59 | 9.4 | 7.3 | soft & flexible |
| Ex 8 | 80 wt. % ESI 1 and 20 wt. % ATH | NA | 13 | 2.5 | NA |
| Ex 9 | 40 wt. % ESI I and 60 wt. % ATH | NA | 9 | 2 | NA |
| Ex 10 | 35 wt. % ESI 1 and 65 wt. % ATH | NA | 7 | 2.5 | NA |
| Ex 11 | 32.5 wt. % ESI 1 and 67.5 wt. % ATH | NA | 7 | 2 | NA |
| Ex 12 | 30 wt. % ESI 1 and 70 wt. % ATH | NA | 6.5 | 2.7 | NA |
| Ex 13 | 80 wt. % ESI 4 and 20 wt. % ATH | NA | NA | 3.1 | NA |
| Ex 14 | 40 wt. % ESI 4 and 60 wt. % ATH | NA | NA | 2.9 | NA |
| Ex 15 | 35 wt. % ESI 4 and 65 wt. % ATH | NA | NA | 2.9 | NA |
| Ex 16 | 32.5 wt. % ESI 4 and 67.5 wt. % ATH | NA | NA | 3.2 | NA |
| Ex 17 | 30 wt. % ESI 4 and 70 wt. % ATH | NA | NA | 3.4 | NA |
| Comp Ex 4 | 35 wt. % EVA 1 and 65 wt. % ATH | 125 | 12.3 | 3.2 | nothing unusual |
| Comp Ex 5 | 35 wt. % EVA 1 and 65 wt. % ATH {1} | 117 | 4.7 | 4.0 | stiff & crumbly |

{1} - 1.25 wt % RC1 Vinyl Silane and 0.25 wt. % Trigonox 29B40
NA - Not Measured
*ATH is Alcan SF 7E ™ Aluminum Trihydrate, Particle size 0.8 μm , tradename of and available from Alcan Corp.

TABLE 5

LSF Data[+]

| Property | Ex 18* | Com Expt 6 |
| --- | --- | --- |
| Polymer | ESI 4 | PVC 2 |
| Tensile Strength at Rupture | 21 MPa | 12.2 MPa |
| Elongation at Break | 168% | 122% |
| Flexural Modulus | 90 MPa | 56 MPa |
| Tear Strength (Room Temp) | 9.5 N/mm | 9.1 N/mm |
| Tear Strength (70° C.) | 7.7 N/mm | 6.8 N/mm |
| Change in TS (aged 7 Days at 100° C.) | 6% | 20% |
| Change in EB (aged 7 Days at 100° C.) | −9% | 20% |
| Temperature Index (BS 2782) | 290° C. | N/A |
| Specific Resistivity (@ 70° C.) | 3.70 E + 10 ohm.m | 1.10E + 10 ohm.m |
| Insulation K-Value (@ 70° C.) | 13,620 Mohm.km | 4,691 Mohm.km |
| Cold Mandrel Test (@ −40° C.) | Pass | Fail |

*Composition [32.1% ESI 4; 65.1% ATH, 2% RCI (coupling Agent); 0.6% T29B40 Peroxide; 0.1% Irganox 1010; 0.05% Irganox MD1024]
[+]ATH was Alcan SF 7E ™ Aluminum Trihydrate, Particle size = 0.8 μm , tradename of and available from Alcan Corp.)

TABLE 6

Processability Data[+]

| Sample | Composition | Extruded Surface Characteristics* |
| --- | --- | --- |
| Ex 19 | 42 wt. % ESI 1 and 58 wt. % ATH {1} | Smooth Surface |
| Comp Ex 7 | 50 wt. % f-PVC 1 and 50 wt. % $CaCO_3$ | Smooth Surface |
| Comp Ex 8 | 42 wt. % EVA 1 and 58 wt. % ATH {1} | Melt Fracture |
| Comp Ex 9 | 42 wt. % POE 1 and 58 wt. % ATH {1} | Melt Fracture |

{1} - 1.25 wt % RC1 Vinyl Silane and 0.25 wt. % Trigonox 29B40
*Extruded at 16° C., 10 rpm
[+]ATH is Alcan SF 7E ™ Aluminum Trihydrate, Particle size = 0.8 μm , tradename of and available from Alcan Corp.

EXAMPLES 20–29

A further series of compositions were prepared comprising ethylene styrene interpolymers and ATH, Calcium Carbonate and ignition resistant polystyrene. For conventional thermoplastic materials, Calcium Carbonate does not normally impart ignition resistance. These formulations were chosen to demonstrate the surprisingly unique properties of the ATH, Calcium Carbonate, interpolymer formulations. The samples were then submitted for flame spread testing. The resulting data are summarized in Table 7. The data in Table 7 demonstrate that it is possible to replace some of the ATH with $CaCO_3$ and the materials are still ignition resistant. The data for Examples 26–29 also show that compositions can be used as blends with ignition resistant and general purpose polystyrene. These data further demonstrate that even interpolymers with high levels of styrene show surprisingly synergistic effects with blends of ATH and Calcium Carbonate.

EXAMPLES 30–35

A further series of compositions were prepared comprising an ethylene styrene interpolymer (ESI 1) and various combinations of silane and peroxide. These formulations were prepared with two commercially employed silane coupling agents. The samples were then submitted for tensile, elongation, tear and penetration testing. The resulting data are summarized in Table 9. The data in Table 9 demonstrate that there is an optimum combination of peroxide and silane but it is also possible to vary the properties of the resulting blend, such as penetration, by varying the levels of silane and peroxide. These data further demonstrate that different coupling agents can be employed in the formulations of the present invention.

EXAMPLES 36–40

A further series of compositions were prepared comprising an ethylene styrene interpolymer (ESI 1) and various combinations of ATH and an oxidized polyethylene processing aid. The samples were then submitted for viscosity testing. The resulting data are summarized in Table 8. The data in Table 8 demonstrate that, in the presence of Allied AC6 processing aid, the viscosity drops. It is surprising that such oxidized polyethylene processing aids work in the presence of a styrene-containing polymer.

TABLE 7

FMVSS 302 Flame Spread Data on ATH/$CaCO_3$ Blends*

| Sample | Composition | FMVSS 302 Flame Spread |
| --- | --- | --- |
| Ex 20 | 70 wt. % ESI 5 and 30 wt. % ATH | Self Extinguishing |
| Ex 21 | 70 wt. % ESI 5 and 30 wt. % $CaCO_3$ | 2.9 in./min. |

TABLE 7-continued

FMVSS 302 Flame Spread Data on ATH/CaCO$_3$ Blends*

| Sample | Composition | FMVSS 302 Flame Spread |
|---|---|---|
| Ex 22 | 70 wt. % ESI 5 and 15 wt. % ATH and 15 wt. % CaCO$_3$ | Self Extinguishing |
| Ex 23 | 40 wt. % ESI 5 and 60 wt. % ATR | Self Extinguishing |
| Ex 24 | 40 wt. % ESI 5 and 60 wt. % CaCO$_3$ | 1.9 in./min. |
| Ex 25 | 40 wt. % ESI 5 and 30 wt. % ATH and 30 wt. % CaCO$_3$ | Self Extinguishing |
| Ex 26 | 70 wt. % ESI 6 and 30 wt. % IRPS 1 | Did Not Ignite |
| Ex 27 | 49 wt. % ESI 6 and 21 wt. % IRPS 1 and 30 wt. % CaCO$_3$ | 2 in./min. |
| Ex 28 | 49 wt. % ESI 6 and 21 wt. % GPPS 1 and 30 wt. % ATH | 0.9 in./min. |
| Ex 29 | 28 wt. % ESI 6 and 12 wt. % GPPS1 and 60 wt. % ATH | Self Extinguishing |

LOI - Limiting Oxygen Index, *CaCO$_3$ for Examples 20–29 was Hubercarb ™ M-3 from J. M. Huber Corporation; ATH was Hydral ™ 710.

TABLE 8

Data for Coupled Compositions

| Sample* | ATH** (wt. %) | Vinyl Silane (wt. %; Type) | Peroxide (wt. %; Type) | Tensile Strength (MPa) | Elongation at Rupture (%) | Tear Strength (N/mm) | Hot Tear Strength (N/mm) at 70° C. | Hot Pressure K = 0.6; at 80° C. (% Penetration) |
|---|---|---|---|---|---|---|---|---|
| Ex 30 | 57 | 1.5%; Comadd ™ DSE 40 | 0.6%; Trigonox 29B40 | 22.6 | 240 | 7.7 | 6.2 | 38.7; 45.9 |
| Ex 31 | 57 | 1.25%; Silquest ™ RC1 | 0.6%; Trigonox 29B40 | 16.9 | 293 | 11.6 | 6.2 | 54.3; 79.1 |
| Ex 32 | 64 | 0.75%; Comadd ™ DSE 40 | 0.6%; Trigonox 29B40 | 19.3 | 185 | 8.6 | 7.2 | 45.7; 50.0 |
| Ex 33 | 64 | 1.5%; Comadd ™ DSE 40 | 0.6%; Trigonox 29B40 | 24.3 | 157 | 5.4 | 5.9 | 46.5; 58.1 |
| Ex 34 | 64 | 1.25%; Silquest ™ RC1 | 0.6%; Trigonox 29B40 | 17.4 | 251 | 8.6 | 7.1 | 43.9; 58.1 |
| Ex 35 | 64 | 2.0%; Silquest ™ RC1 | 0.6%; Trigonox 29B40 | 17.5 | 231 | 13.0 | 7.4 | 48.6; 43.2 |

*ESI 1 with 0.1% Irganox 1010 and 0.05% Irganox MD 1024
**Baco Superfine ™ 7E, a product and trademark of the Alcan Chemical Corp..

EXAMPLES 41–54

A further series of compositions were prepared comprising ethylene styrene interpolymers and various combinations of ATH, Calcium Carbonate, and CGL 116. These formulations were chosen with a wide range of interpolymer compositions, from about 29 wt. % styrene to about 69 wt. % styrene; a wide range of ATH loadings, from about 15 wt. % to about 30 wt. %; and a wide range of Calcium Carbonate levels, from zero wt. % to about 30 wt. %. The samples were then submitted for burn testing. The resulting data are summarized in Table 10. The data in Table 10 demonstrate that there is a surprising synergistic interaction of CGL 116 with ATH resulting in a lower LOI reading and improved UL-94 rating. These data further demonstrate that this synergy extends over a wide range of interpolymer compositions.

EXAMPLES 55–62 AND COMPARATIVE EXAMPLES 10–11

A further series of compositions were prepared comprising ethylene styrene interpolymers and various combinations of EAA, EVA, EPDM, ATH, and Zinc Borate. These particular formulations were chosen to meet the mechanical and electrical requirements of low and medium voltage cable jacketing, and were prepared using a wide range of interpolymer compositions, comprising from about 28 wt. % styrene to about 76 wt. % styrene. The samples were then submitted for Shore D hardness and LOI testing. The resulting data are summarized in Table 11. The data in Table 11 demonstrate that when ESI is substituted for a mixture of EVA, EP rubber and polypropylene it is still possible to maintain good Shore D hardness and LOI. These data also demonstrate that a wide range styrene-containing interpolymers compositions can, surprisingly, be used in these high performance applications and still maintain excellent mechanical and ignition resistance properties.

EXAMPLES 63–67

A further series of compositions were prepared comprising ethylene styrene interpolymers and ATH and CaCO3 mixtures. The samples were then submitted for LOI and burn time testing. For conventional styrenic-containing thermoplastic materials, Calcium Carbonate does not normally impart ignition resistance. These formulations were chosen to demonstrate the surprisingly unique properties of the ATH, Calcium Carbonate, interpolymer formulations, with the interpolymer compositions ranging from about 29 wt. % styrene to about 69 wt. % styrene. The resulting data are summarized in Table 12. The data in Table 12 demonstrate that a wide range of interpolymer compositions can be employed in the present invention with synergistic ignition resistance between the ATH, the Calcium Carbonate, and the interpolymer, as evidenced by the excellent LOI and burn time data.

TABLE 9

Process Aid Data

| | | Composition {1} | | Viscosity (Poise at |
|---|---|---|---|---|
| Sample | ESI 1 (wt %) | ATH | Allied AC6 | 100 1/sec.) |
| Ex 36 | 35 wt. % | 65.0 wt. % | 0 | 5.40E + 04 |
| Ex 37 | 30 wt. % | 65.0 wt. % | 5 | 4.20E + 04 |
| Ex 38 | 32.5 wt. % | 67.5 wt. % | 0 | 8.00E + 04 |
| Ex 39 | 27.5 wt. % | 67.5 wt. % | 5 | 5.00E + 04 |
| Ex 40 | 25 wt. % | 70.0 wt. % | 5 | 7.00E + 04 |

{1} - 0.1 wt % Irganox 1010 and 0.05 wt. % Irganox MD 1024

TABLE 10

Hindered Amine Data

| Sample | Interpolymer | ATH* wt % | CaCO₃⁺ wt % | CGL116 wt % | LOI (% O2) | UL-94 Rating Class (3 mm) | Burn t1 (sec.) | Time t2 (sec.) |
|---|---|---|---|---|---|---|---|---|
| Ex 41 | 70 wt. % ESI 7 | 30 | 0 | 0 | 24.1 | NR | 23.1 | 28 |
| Ex 42 | 50 wt. % ESI 7 | 50 | 0 | 0 | 24.6 | NR | 32.5 | 2.5 |
| Ex 43 | 40 wt. % ESI 7 | 60 | 0 | 0 | 26.8 | NR | 2.1 | 32.5 |
| Ex 44 | 40 wt. % ESI 7 | 30 | 30 | 0 | 23.7 | V-2 | 24.2 | 2 |
| Ex 45 | 70 wt. % ESI 7 | 15 | 15 | 0 | 22 | NR | 17.1 | 152 |
| Ex 46 | 50 wt. % ESI 7 | 49 | 0 | 1 | 23.3 | NR | 37.9 | 3.2 |
| Ex 47 | 99 wt. % ESI 7 | 0 | 0 | 1 | 21.8 | NR | 13.7 | 113.5 |
| Ex 48 | 97.5 wt. % ESI 7 | 0 | 0 | 2.5 | 22.3 | NR | 13.1 | 54 |
| Ex 49 | 69 wt. % ESI 7 | 30 | 0 | 1 | 29 | V-2 | 2.6 | 2 |
| Ex 50 | 39 wt. % ESI 7 | 30 | 30 | 1 | 26.7 | V-2 | 18 | 3.5 |
| Ex 51 | 67.5 wt. % ESI 7 | 15 | 15 | 2.5 | 24.2 | V-2 | 4.5 | 1 |
| Ex 52 | 37.5 wt. % ESI 7 | 30 | 30 | 2.5 | 26.3 | V-2 | 3.9 | 1 |
| Ex 53 | 69 wt. % ESI 8 | 30 | 0 | 1 | 23.3 | NR | 8.4 | 44 |
| Ex 54 | 69 wt. % ESI 9 | 30 | 0 | 1 | 27.9 | V-2 | 2.2 | 1.5 |

NR = No Rating
tI = Burn Time after First Ignition
t2 = Burn Time after Second Ignition
*ATH is Martinal ™ OL-104 C a product and trademark of Martins Werk, Germany.
⁺CaCO₃ is Omyacarb 10-BG a product and trademark of OMYA GmbH, Germany.

TABLE 11

Borate Data

| Example No. | Ex. 55 | Ex. 56 | Ex. 57 | Ex. 58 | Ex. 59 | Ex. 60 | Ex. 61 | Ex. 62 | Comp Ex. 10 | Comp Ex. 11 |
|---|---|---|---|---|---|---|---|---|---|---|
| Composition/Property | | | | | | | | | | |
| Primacor ™ 1430 Copolymer | 0 | 5 | 4 | 0 | 0 | 0 | 15 | 5 | 21.71 | 0 |
| Primacor ™ 3460 Copolymer | 0 | 0 | 0 | 0 | 0 | 0 | 0 | 0 | 0 | 15.3 |
| EVA 5 | 0 | 0 | 0 | 0 | 0 | 0 | 0 | 0 | 4.93 | 0 |
| EVA 6 | 0 | 0 | 0 | 0 | 0 | 0 | 0 | 0 | 0 | 5.5 |
| Nordel ™ 465A EPDM | 0 | 0 | 0 | 0 | 0 | 0 | 0 | 0 | 12.82 | 0 |
| Excellor ™ 1801 EPR | 0 | 0 | 0 | 0 | 0 | 0 | 0 | 0 | 0 | 4.5 |
| ESI 12 | 0 | 0 | 0 | 0 | 25.5 | 0 | 0 | 0 | 0 | 0 |
| ESI 10 | 25 | 25 | 21.5 | 25.5 | 0 | 0 | 0 | 0 | 0 | 0 |
| ESI 11 | 14.5 | 9.5 | 0 | 0 | 0 | 0 | 0 | 0 | 0 | 0 |
| ESI 13 | 0 | 0 | 0 | 0 | 0 | 28 | 0 | 0 | 0 | 0 |
| ESI 18 | 0 | 0 | 0 | 0 | 0 | 0 | 16.5 | 26.5 | 0 | 0 |
| Alcoa Hydral ™ 710 ATH | 50.5 | 50 | 66 | 66 | 66 | 65 | 60 | 60 | 49.32 | 0 |
| Alcoa Hydral ™ 712 ATH | 0 | 0 | 0 | 0 | 0 | 0 | 0 | 0 | 0 | 64 |
| Zinc Borate | 5 | 5 | 4 | 4 | 4 | 5 | 4 | 4 | 4.93 | 4 |
| GE SFR-100 Silicone | 5 | 5 | 3 | 3 | 3 | 2 | 3 | 3 | 4.93 | 3 |
| Tartaric Acid | 0 | 0.5 | 1.5 | 1.5 | 1.5 | 0 | 1.5 | 1.5 | 0.68 | 1.5 |
| Proflow ™ 3000 | 0 | 0 | 0 | 0 | 0 | 0 | 0 | 0 | 0 | 2 |
| Irganox ™ 1010 | 0 | 0 | 0 | 0 | 0 | 0 | 0 | 0 | 0.68 | 0 |
| Irganox ™ 1076 | 0 | 0 | 0 | 0 | 0 | 0 | 0 | 0 | 0 | 0.1 |
| Irgafos ™ 168 | 0 | 0 | 0 | 0 | 0 | 0 | 0 | 0 | 0 | 0.1 |
| Shore D Hardness | NA | NA | NA | NA | NA | NA | 69.1 | 72.2 | NA | 62.2 |
| Limiting Oxygen Index (% O2) | 25 | 58 | 45 | 27 | 47 | 47 | 30.2 | 38.6 | 29 | 44.7 |

TABLE 12

LOI and Burn Time Testing*

| Example # | ESI# | wt % ATH (vol %) | wt % CaCO₃ (vol %) | LOI | Burn time ($t_1/t_2$, sec) |
|---|---|---|---|---|---|
| Ex 63 | 14 | 60 (38.8) | 0 (0) | 33 | 0.7/0.8 |
| Ex 64 | 16 | 35 (25.5) | 35 (22.6) | 32 | 0.9/1.0 |
| Ex 65 | 15 | 60 (37.2) | 0 (0) | 30 | 0.8/0.8 |
| Ex 66 | 17 | 36 (28.4) | 44 (30.9) | N/A | 0.7/0.7 |
| Ex 67 | 17 | 36 (29.3) | 44 (31.9) | N/A | 0.7/0.7 |

*Formula for converting wt % to vol % A in a multicomponent mixture:
vol % A = [wt % A/ρ(A)]/[wt % A/ρ(A) + wt % B/ρ(B) + wt % C/ρ(C)]
where ρ(A) = density of A in g/cm³.

What is claimed is:
1. A composition comprising
   (A) from about 5 to about 90 weight percent by weight of at least one substantially random interpolymer prepared by polymerizing ethylene and/or one or more α-olefin monomers with one or more vinyl or vinylidene aromatic monomers, and optionally with other polymerizable ethylenically unsaturated monomer(s);
   (B) from about 10 to about 94.9 percent by weight of at least one filler selected from ammonium polyphosphate, magnesium hydroxide, calcium hydroxide, and aluminum trihydrate; and
   (C) one or more components selected from the group consisting of
      (1) about 5 to about 50 weight percent by weight of at least one filler selected from talc, calcium carbonate, glass fibers, marble dust, cement dust, clay, feldspar, silica or glass, fumed silica, silicates, alumina, magnesium oxide, antimony oxide, zinc oxide, barium sulfate, aluminum silicate, calcium silicate, titanium oxides, glass microspheres, mica, clays, wollastonite, and chalk;

(2) about 0.5 to about 20 percent by weight of at least one metal borate selected from the metal borates of Group IIA, and, optionally, about 0.5 to about 10 percent by weight of at least one processing aid selected from the group consisting of polydimethylsiloxane, organopolysiloxanes, tartaric acid, stearic acid, zinc stearic, waxes, and high melt flow polyolefins;

(3) about 0.1 to about 15 percent by weight of at least one initiator or at least one coupling agent selected from the group consisting of organic peroxides, silanes, titanates, zirconates, multifunctional vinyl compounds and organic azides;

(4) about 0.1 to about 20 percent by weight of at least one hindered amine stabilizer;

wherein the amounts of (A), (B) and (C) are based on the total weight of (A), (B) and (C).

2. The composition of claim 1 wherein the interpolymer is prepared by polymerizing
   (a) from about 35 to about 99.5 mole percent of ethylene and/or one or more α-olefin monomers;
   (b) from about 0.5 to about 65 mole percent of one or more vinyl or vinylidene aromatic monomers; and
   (c) optionally other polymerizable ethylenically unsaturated monomer(s).

3. The composition of claim 1 wherein said interpolymer is an interpolymer of ethylene and styrene or an interpolymer of ethylene, styrene and one or more $C_3$ to $C_{10}$ α-olefin monomers.

4. The composition of claim 2 wherein said interpolymer is an interpolymer of ethylene and styrene or an interpolymer of ethylene, styrene and one or more $C_3$ to $C_{10}$ α-olefin monomers.

5. The composition of claim 1 wherein said interpolymer is prepared using a metallocene catalyst and is an interpolymer of ethylene and styrene or an interpolymer of ethylene, styrene and one or more $C_3$ to $C_{10}$ α-olefin monomers.

6. The composition of claim 1 wherein Component (B) is present in an amount of from about 20 to about 80 weight percent and is selected from aluminum trihydrate, magnesium hydroxide, calcium hydroxide, ammonium polyphosphate, and a mixture thereof and wherein Component (C)(1) is present in an amount of from about 5 to about 50 weight percent and is one or more fillers selected from talc, calcium carbonate, barium sulfate, silicates, clay, and a mixture thereof, based on the total weight of the interpolymer(s) and the filler(s).

7. The composition of claim 1 wherein Component (B) is present in an amount of from about 20 to about 80 weight percent and is selected from aluminum trihydrate, magnesium hydroxide, calcium hydroxide, ammonium polyphosphate, and mixtures thereof and wherein Component (C)(2) is present in an amount of from about 0.5 to about 20 weight percent and is zinc borate, and the processing aid is polydimethylsiloxane and/or tartaric acid.

8. The composition of claim 1 wherein Component (B) is present in an amount of from about 20 to about 80 weight percent and is selected from aluminum trihydrate, magnesium hydroxide, calcium hydroxide, ammonium polyphosphate, and mixtures thereof and wherein Component (C)(3) is present in an amount of from about 0.5 to about 10 weight percent and is selected from organic peroxides, silanes, titanates, zirconates, multifunctional vinyl compounds, organic azides, and mixtures thereof.

9. The composition of claim 8 wherein the coupling agent couples at least a portion of at least one filler to at least a portion of at least one interpolymer.

10. The composition of claim 1 wherein Component (B) is present in an amount of from about 20 to about 80 weight percent and is selected from aluminum trihydrate, magnesium hydroxide, calcium hydroxide, ammonium polyphosphate, and mixtures thereof and Component (C)(4) is present in an amount of from about 0.5 to about 10 weight percent.

11. The composition of any one of claims 1–10 comprising from about 0.1 to about 84.9 weight percent of one or more additional polymeric components, based on the total weight of the composition.

12. A fabricated article made from the polymer composition of any one of claims 1–11.

13. The fabricated article of claim 12 in the form of a film or sheet or multilayered structure.

14. The fabricated article of claim 12 in the shape of a floor, wall or ceiling covering.

15. The fabricated article of claim 12 in the form of a foam or in the form of fibers.

16. The fabricated article of claim 12 in the form of a cable, a wire or cable assembly, a junction box, a conduit, a cable tray, a cable support, an electrical union or joint, or an electrical device.

17. The fabricated article of claim 12 made by injection molding, compression molding, extrusion, or blow molding.

18. The fabricated article of claim 12 in which the one or more additional polymeric components are crosslinked.

19. A product made by the process of thermomixing:
   (A) from about 5 to about 90 weight percent by weight of at least one substantially random interpolymer prepared by polymerizing one or more α-olefin monomers with one or more vinyl or vinylidene aromatic monomers, and optionally with other polymerizable ethylenically unsaturated monomer(s);
   (B) from about 10 to about 94.9 percent by weight of at least one filler selected from ammonium polyphosphate, magnesium hydroxide, calcium hydroxide, and aluminum trihydrate; and
   (C) one or more components selected from the group consisting of
      (1) about 5 to about 50 weight percent by weight of at least one filler selected from talc, calcium carbonate, glass fibers, marble dust, cement dust, clay, feldspar, silica or glass, fumed silica, silicates, alumina, magnesium oxide, antimony oxide, zinc oxide, barium sulfate, aluminum silicate, calcium silicate, titanium oxides, glass microspheres, mica, clays, wollastonite, and chalk;
      (2) about 0.5 to about 20 percent by weight of at least one metal borate selected from the metal borates of Group IIA, and, optionally, about 0.5 to about 10 percent by weight of at least one processing aid selected from the group consisting of polydimethylsiloxane, organopolysiloxanes, tartaric acid, stearic acid, zinc stearic, waxes, and high melt flow polyolefins;
      (3) about 0.1 to about 15 percent by weight of at least one coupling agent or at least one initiator selected from the group consisting of organic peroxides, silanes, titanates, zirconates, multifunctional vinyl compounds and organic azides;
      (4) about 0.1 to about 20 percent by weight of at least one hindered amine stabilizer;

wherein the amounts of (A), (B) and (C) are based on the total weight of (A), (B) and (C).

20. A product derived from the mixture comprising:
(A) from about 5 to about 90 weight percent by weight of at least one substantially random interpolymer prepared by polymerizing one or more α-olefin monomers with one or more vinyl or vinylidene aromatic monomers, and optionally with other polymerizable ethylenically unsaturated monomer(s);
(B) from about 10 to about 94.9 percent by weight of at least one filler selected from ammonium polyphosphate, magnesium hydroxide, calcium hydroxide, and aluminum trihydrate; and
(C) one or more components selected from the group consisting of
  (1) about 5 to about 50 weight percent by weight of at least one filler selected from talc, calcium carbonate, glass fibers, marble dust, cement dust, clay, feldspar, silica or glass, fumed silica, silicates, alumina, magnesium oxide, antimony oxide, zinc oxide, barium sulfate, aluminum silicate, calcium silicate, titanium oxides, glass microspheres, mica, clays, wollastonite, and chalk;
  (2) about 0.5 to about 20 percent by weight of at least one metal borate selected from the metal borates of Group IIA, and, optionally, about 0.5 to about 10 percent by weight of at least one processing aid selected from the group consisting of polydimethylsiloxane, organopolysiloxanes, tartaric acid, stearic acid, zinc stearic, waxes, and high melt flow polyolefins;
  (3) about 0.1 to about 15 percent by weight of at least one initiator or at least one coupling agent selected from the group consisting of organic peroxides, organic azides, silanes, titanates, zirconates, and multifunctional vinyl compounds; and
  (4) about 0.1 to about 20 percent by weight of at least one hindered amine stabilizer;
wherein the amounts of (A), (B) and (C) are based on the total weight of (A), (B) and (C).

21. The composition of claims 1–20 which further comprises from about 0.1 to about 10 weight percent oxidized polyethylene.

22. The composition of claim 1 comprising about 5 to about 20 weight percent of an ethylene acrylic acid copolymer, wherein Component (B) is present in an amount of from about 20 to about 80 weight percent and is selected from aluminum trihydrate, magnesium hydroxide, and mixtures thereof and wherein Component (C)(2) is present in an amount of from about 0.5 to about 20 weight percent and is zinc borate, and the processing aid is polydimethylsiloxane and/or tartaric acid.

* * * * *